United States Patent
Kubo et al.

(10) Patent No.: US 9,332,142 B2
(45) Date of Patent: May 3, 2016

(54) COOPERATION SYSTEM, IMAGE FORMING APPARATUS, PORTABLE INFORMATION DEVICE, REMOTE CONTROL METHOD, AND REMOTE OPERATION METHOD

(71) Applicant: Konica Minolta, Inc., Chiyoda-ku, Tokyo (JP)

(72) Inventors: Hiroaki Kubo, Muko (JP); Atsushi Ohshima, Amagasaki (JP); Toshihiko Otake, Ikeda (JP); Toshimichi Iwai, Nara-ken (JP); Takehisa Yamaguchi, Ikoma (JP); Masaya Hashimoto, Itami (JP); Tomoaki Nakajima, Kobe (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/628,425

(22) Filed: Feb. 23, 2015

(65) Prior Publication Data
US 2015/0256693 A1    Sep. 10, 2015

(30) Foreign Application Priority Data

Mar. 4, 2014 (JP) ................................. 2014-041451

(51) Int. Cl.
*G06F 3/12* (2006.01)
*H04N 1/00* (2006.01)

(52) U.S. Cl.
CPC ....... *H04N 1/00506* (2013.01); *H04N 1/00129* (2013.01); *H04N 1/00307* (2013.01); *H04N1/00408* (2013.01); *H04N 1/00925* (2013.01); *H04N 1/00973* (2013.01); *H04N 2201/0075* (2013.01); *H04N 2201/0094* (2013.01)

(58) Field of Classification Search
CPC .............. G09G 2320/0626; G09G 2320/0653; G09G 2320/0666; G09G 2320/0242; H04M 1/75572; H04M 1/7253; H04M 1/72533; H04M 1/72569; H04M 11/007; G06F 3/14; G06F 3/0484; G06F 3/0481; H04N 1/00411; H04N 1/00129; H04N 1/00307; H04N 1/00506; H04N 13/0025; H04N 13/0275; H04N 21/4312; H04N 21/4318; H04N 21/42222
See application file for complete search history.

(56) References Cited

U.S. PATENT DOCUMENTS

| | | | | |
|---|---|---|---|---|
| 8,285,210 B2* | 10/2012 | Oshima | ................... | H04W 4/02 358/1.15 |
| 8,446,373 B2* | 5/2013 | Day | ................... | G06F 3/04883 345/156 |
| 2012/0166985 A1* | 6/2012 | Friend | ................... | G06F 9/4448 715/765 |

FOREIGN PATENT DOCUMENTS

| | | |
|---|---|---|
| JP | 2002-320098 A | 10/2002 |
| JP | 2007-36574 A | 2/2007 |
| JP | 2012-134897 A | 7/2012 |
| JP | 2013-16070 A | 1/2013 |

* cited by examiner

*Primary Examiner* — Mohammad Ghayour
*Assistant Examiner* — Jonathan R Beckley
(74) *Attorney, Agent, or Firm* — Buchanan Ingersoll & Rooney PC

(57) ABSTRACT

A portable information device includes a first display portion in which a parameter that defines a color for displaying an image is set, and a remote operation portion to display a remote operation screen on the first display portion and transmit a remote operation to an image forming apparatus. The image forming apparatus includes an apparatus-side display control portion to display an operation screen on a second display portion, and a remote control portion to transmit a remote operation screen to the portable information device and execute a process in accordance with a remote operation. One of the portable information device and the image forming apparatus acquires a distance between the image forming apparatus and the portable information device and determines an update parameter based on the acquired distance. The remote operation portion updates the parameter set in the first display portion with the update parameter.

12 Claims, 13 Drawing Sheets

F I G. 6
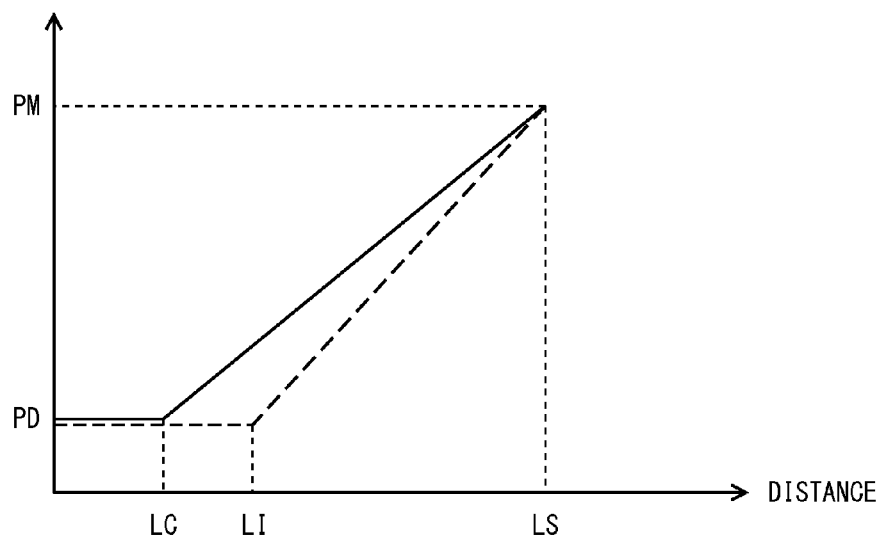

F I G. 1 2
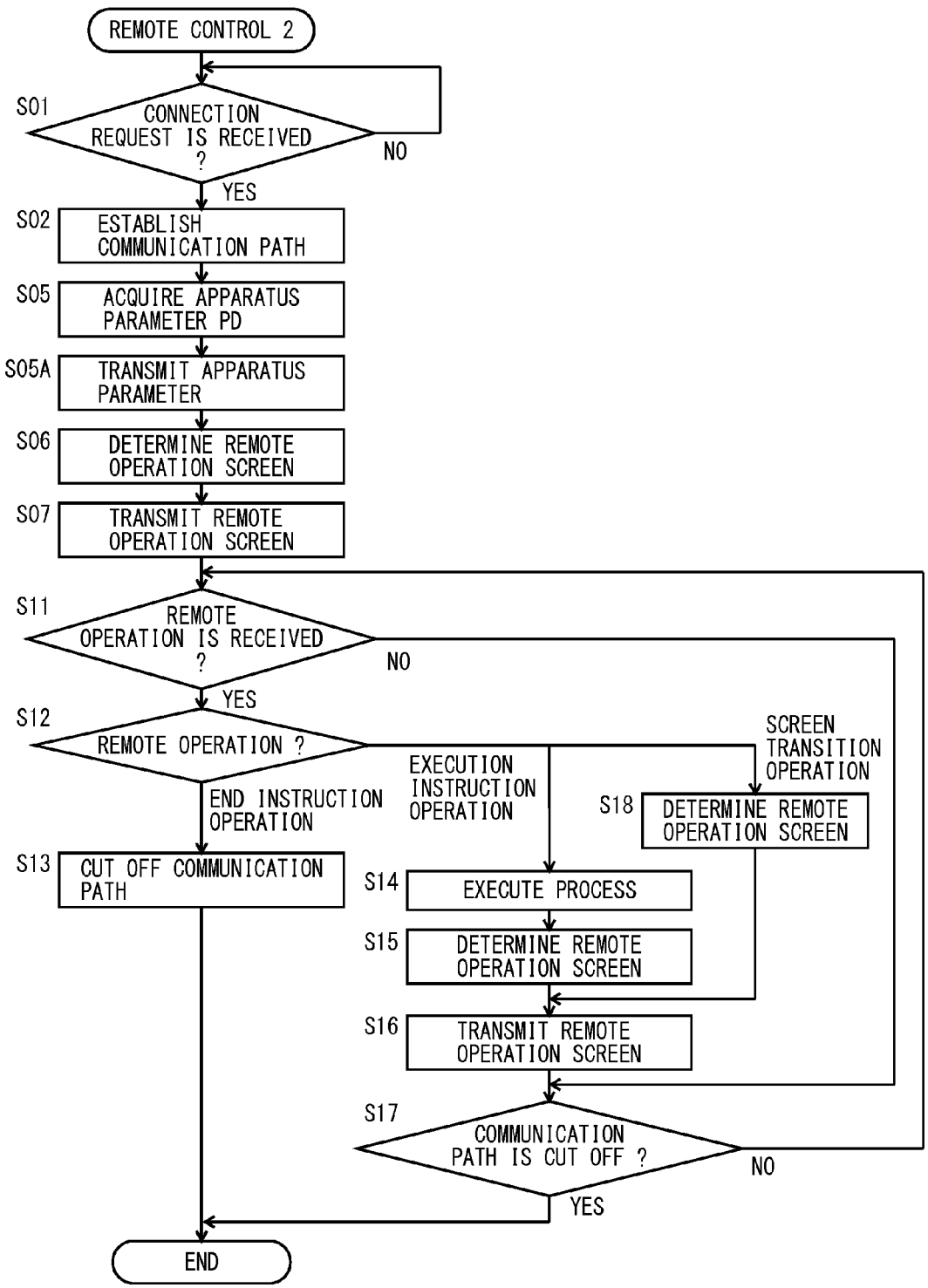

COOPERATION SYSTEM, IMAGE FORMING APPARATUS, PORTABLE INFORMATION DEVICE, REMOTE CONTROL METHOD, AND REMOTE OPERATION METHOD

This application is based on Japanese Patent Application No. 2014-041451 filed with Japan Patent Office on Mar. 4, 2014, the entire content of which is hereby incorporated by reference.

BACKGROUND OF THE INVENTION

1. Field of the Invention

The present invention relates to a cooperation system, an image forming apparatus, a portable information device, a remote control method, a remote operation method, a non-transitory computer-readable recording medium encoded with a remote control program, and a non-transitory computer-readable recording medium encoded with a remote operation program. More specifically, the present invention relates to a cooperation system including an image forming apparatus remotely operated by a portable information device, the image forming apparatus, a remote control method performed in the image forming apparatus, a non-transitory computer-readable recording medium encoded with a remote control program, the portable information device, a remote operation method performed in the portable information device, and a non-transitory computer-readable recording medium encoded with a remote operation program.

2. Description of the Related Art

In recent year, a technique for remotely operating a Multi Function Peripheral (MFP) using a portable information device such as a mobile phone is known. In this case, a remote operation screen for remotely operating the MFP is displayed on the portable information device.

When an image is displayed on electronic equipment, the same color may appear different depending on the settings of the electronic equipment. To address this situation, there is a technique called color matching for matching display colors among equipment. For example, Japanese Patent Laid-Open No. 2002-320098 describes an image processing system including a server and terminals connected to a network, in which the server includes profile storage means for storing a plurality of profiles associated with terminals or printers in the system and observation condition storing means for storing a plurality of observation conditions for images. The profile and the observation condition selected by the terminal are extracted from these storage means, and the observation condition is set in the profile so that color matching is performed based on the set profile.

Users carry portable information devices and use them relatively frequently and, therefore, are accustomed to the colors displayed on their portable information devices. Unfortunately, the users may feel uncomfortable if a color matched image appears when a remote operation screen for remotely operating an MFP is displayed.

SUMMARY OF THE INVENTION

According to an aspect of the present invention, a cooperation system is configured with an image forming apparatus and a portable information device capable of communicating with the image forming apparatus. The portable information device includes: a first display portion in which a parameter that defines a color for displaying an image is set; and a remote operation portion to display a remote operation screen received from the image forming apparatus on the first display portion and transmit a remote operation input by a user in accordance with the remote operation screen to the image forming apparatus. The image forming apparatus includes: a second display portion in which a parameter that defines a color for displaying an image is set; an apparatus-side display control portion to display an operation screen on the second display portion; and a remote control portion to transmit a remote operation screen related to the operation screen displayed on the second display portion to the portable information device and execute a process in accordance with a remote operation received from the portable information device in response to transmission of the remote operation screen. One of the portable information device and the image forming apparatus includes: a distance acquisition portion to acquire a distance between the image forming apparatus and the portable information device; and a determination portion to determine an update parameter based on the acquired distance. The remote operation portion includes a parameter change portion to update the parameter set in the first display portion with the update parameter determined by the determination portion.

According to another aspect of the present invention, an image forming apparatus is remotely controlled by a portable information device including a first display portion in which a parameter that defines a color for displaying an image is set. The image forming apparatus includes: a second display portion in which a parameter that defines a color for displaying an image is set; an apparatus-side display control portion to display an operation screen on the second display portion; a remote control portion to transmit a remote operation screen related to the operation screen displayed on the second display portion to the portable information device and execute a process in accordance with a remote operation received from the portable information device in response to transmission of the remote operation screen; and a distance acquisition portion to acquire a distance to the portable information device. The remote control portion includes a determination portion to determine an update parameter based on the acquired distance, and a parameter change instruction portion to allow the portable information device to update the parameter set in the first display portion with the determined update parameter.

According to a further aspect of the present invention, a portable information device includes: a first display portion in which a parameter that defines a color for displaying an image is set; a receiving portion to receive, from an image forming apparatus including a second display portion in which a parameter that defines a color for displaying an image is set, a remote operation screen related to an operation screen displayed on the second display portion; a first display control portion to display the received remote operation screen on the first display portion; a remote operation transmitting portion to transmit a remote operation input by a user in accordance with the displayed remote operation screen to the image forming apparatus in order to allow the image forming apparatus to execute a process in accordance with the remote operation; a distance acquisition portion to acquire a distance to the image forming apparatus; a determination portion to determine an update parameter based on the acquired distance; and a parameter change portion to update the parameter set in the first display portion with the determined update parameter.

According to a still further aspect of the present invention, a remote control method is performed in an image forming apparatus remotely controlled by a portable information device including a first display portion in which a parameter that defines a color for displaying an image is set. The image forming apparatus includes a second display portion in which a parameter that defines a color for displaying an image is set. The method includes: an apparatus-side display control step of displaying an operation screen on the second display portion; a step of transmitting a remote operation screen related to the operation screen displayed on the second display portion to the portable information device; a remote control step of executing a process in accordance with a remote operation received from the portable information device in response to transmission of the remote operation screen; and a distance acquisition step of acquiring a distance to the portable information device. The remote control step includes a determination step of determining an update parameter based on the acquired distance, and a parameter change instruction step of allowing the portable information device to update the parameter set in the first display portion with the determined update parameter.

According to yet another aspect of the present invention, a remote operation method is performed in a portable information device including a first display portion in which a parameter that defines a color for displaying an image is set. The portable information device is capable of remotely controlling an image forming apparatus including a second display portion in which a parameter that defines a color for displaying an image is set. The method includes: a receiving step of receiving a remote operation screen related to an operation screen displayed on the second display portion from the image forming apparatus; a first display control step of displaying the received remote operation screen on the first display portion; a remote operation transmitting step of transmitting a remote operation input by a user in accordance with the displayed remote operation screen to the image forming apparatus in order to allow the image forming apparatus to execute a process in accordance with the remote operation; a distance acquisition step of acquiring a distance to the image forming apparatus; a determination step of determining an update parameter based on the acquired distance; and a parameter change step of updating the parameter set in the first display portion with the determined update parameter.

According to a further aspect of the present invention, a non-transitory computer-readable recording medium is encoded with a remote control program executed in a computer for controlling an image forming apparatus remotely controlled by a portable information device including a first display portion in which a parameter that defines a color for displaying an image is set. The image forming apparatus includes a second display portion in which a parameter that defines a color for displaying an image is set. The program causes the computer to perform processing comprising: an apparatus-side display control step of displaying an operation screen on the second display portion; a step of transmitting a remote operation screen related to the operation screen displayed on the second display portion to the portable information device; a remote control step of executing a process in accordance with a remote operation received from the portable information device in response to transmission of the remote operation screen; and a distance acquisition step of acquiring a distance to the portable information device. The remote control step includes a determination step of determining an update parameter based on the acquired distance, and a parameter change instruction step of allowing the portable information device to update the parameter set in the first display portion with the determined update parameter.

According to a still further aspect of the present invention, a non-transitory computer-readable recording medium is encoded with a remote operation program executed in a computer for controlling a portable information device including a first display portion in which a parameter that defines a color for displaying an image is set. The portable information device is capable of remotely controlling an image forming apparatus including a second display portion in which a parameter that defines a color for displaying an image is set. The program causes the computer to perform processing comprising: a receiving step of receiving a remote operation screen related to an operation screen displayed on the second display portion from the image forming apparatus; a first display control step of displaying the received remote operation screen on the first display portion; a remote operation transmitting step of transmitting a remote operation input by a user in accordance with the displayed remote operation screen to the image forming apparatus in order to allow the image forming apparatus to execute a process in accordance with the remote operation; a distance acquisition step of acquiring a distance to the image forming apparatus; a determination step of determining an update parameter based on the acquired distance; and a parameter change step of updating the parameter set in the first display portion with the determined update parameter.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 6 is a graph illustrating an example of the relation between the distance between the portable information device and the MFP and an update parameter.

FIG. 12 is a flowchart showing an example of the procedure of a remote control process in the second embodiment.

DESCRIPTION OF THE PREFERRED EMBODIMENTS

Figure 1:
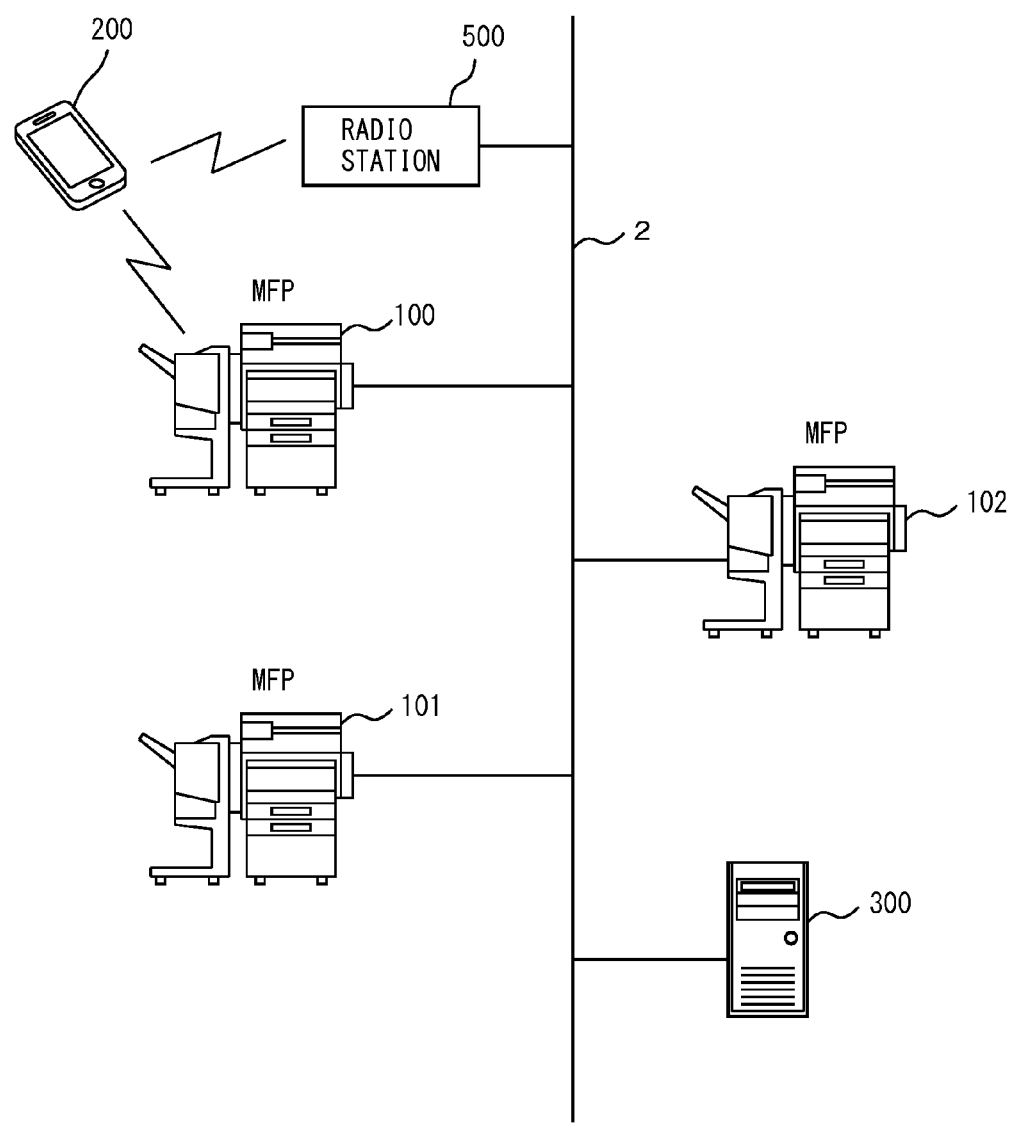
FIG. 1 is a diagram showing an example of an overview of a cooperation system in an embodiment of the present invention.

Embodiments of the present invention will be described below in conjunction with the figures. In the following description, the same parts are denoted with the same reference numerals. Their names and functions are also the same. A detailed description thereof is therefore not repeated.

<First Embodiment>

FIG. 1 is a diagram showing an example of an overview of a cooperation system in an embodiment of the present invention. Referring to FIG. 1, cooperation system 1 includes MFPs (Multi Function Peripherals) 100, 101, 102, a portable information device 200, a server 300, and a radio station 500, each connected to a network 2.

MFPs 100, 101, 102 are an example of the image forming apparatus. MFPs 100, 101, 102 each include a document scanning function for scanning a document, an image forming function for forming an image on a recording medium such as paper based on image data, and a facsimile transmission/reception function for transmitting/receiving facsimile data. In the present embodiment, MFPs 100, 101, 102 are described as an example of the image forming apparatus. However, MFPs 100, 101, 102 may be replaced by any other apparatuses that include a function of executing a process, for example, such as printers, scanners, and personal computers. MFPs 100, 101, 102 have the same hardware and functions and MFP 100 will be taken as an example in the following description, unless otherwise specified.

Server 300 is a general computer and is an example of the information processing apparatus. A printer driver program for controlling MFPs 100, 101, 102 is installed in server 300. If MFPs 100, 101, 102 are of different kinds, three kinds of printer driver programs for controlling MFPs 100, 101, 102 are installed in server 300.

Portable information device 200 is, for example, a PDA (Personal Digital Assistant) or a smart phone carried by the user and has a wireless LAN function and a short-range wireless communication function. Here, portable information device 200 is a smart phone and additionally has a call function. Portable information device 200 can wirelessly communicate with a mobile phone base station and connect to a mobile phone network to make a call.

Network 2 is a Local Area Network (LAN), either wired or wireless. Network 2 is not limited to a LAN and may be, for example, a network using a public switched telephone network. Network 2 is connected to a Wide Area Network (WAN) such as the Internet. MFPs 100, 101, 102 each can transmit/receive data to/from server 300 through network 2.

Radio station 500 is a relay device for network 2 and communicates with portable information device 200 having a wireless LAN function to connect portable information device 200 to network 2. MFPs 100, 101, 102 and server 300 each can transmit/receive data to/from portable information device 200 through network 2 and radio station 500.

Figure 2:
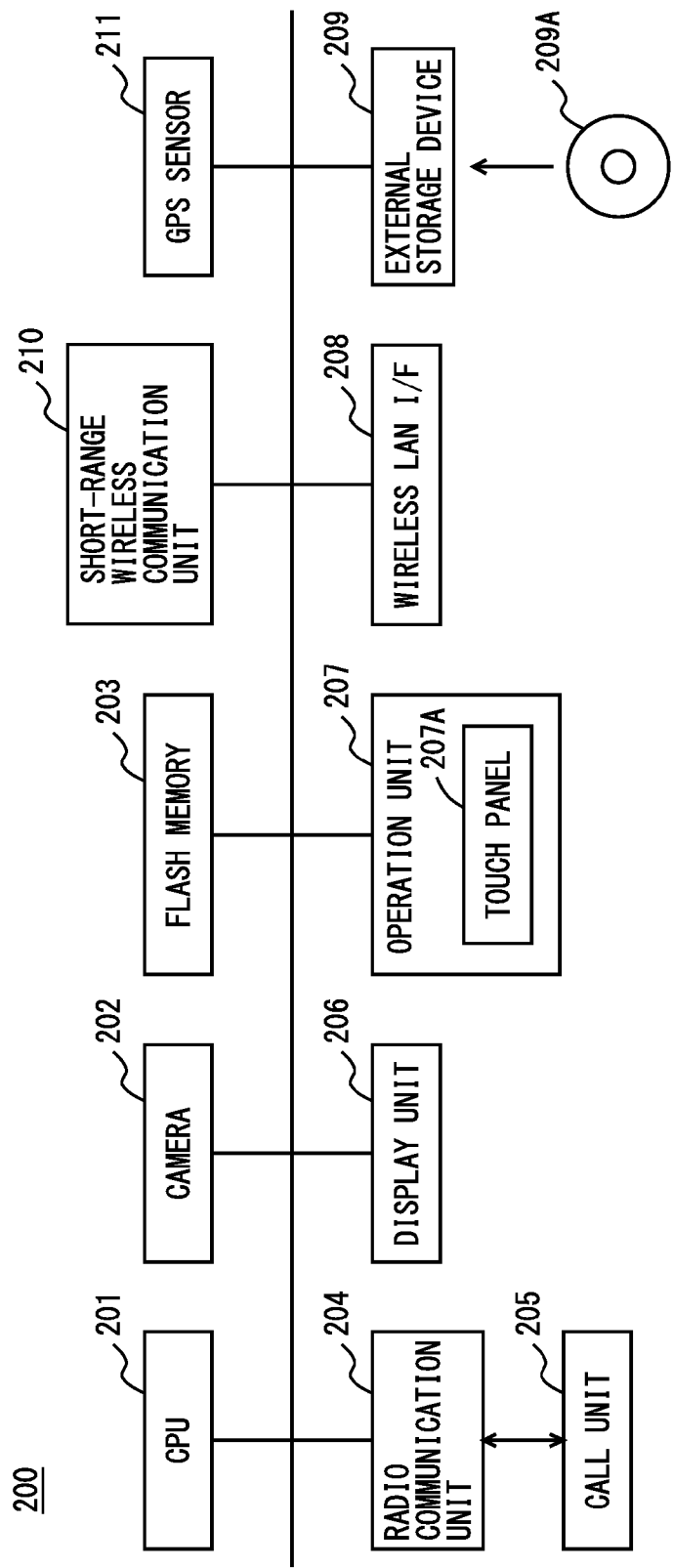
FIG. 2 is a block diagram showing an overall hardware configuration of a portable information device in the first embodiment.

FIG. 2 is a block diagram showing an overall hardware configuration of the portable information device in the first embodiment. Referring to FIG. 2, portable information device 200 includes a CPU 201 for centrally controlling portable information device 200, a camera 202, a flash memory 203 for storing data in a nonvolatile manner, a call unit 205, a radio communication unit 204 connected to call unit 205, a display unit 206 displaying information, an operation unit 207 accepting input of a user's operation, a wireless LAN I/F 208, an external storage device 209, a short-range wireless communication unit 210, and a GPS sensor 211.

Radio communication unit 204 communicates by radio with a mobile phone base station connected to a telephone communication network. Radio communication unit 204 connects portable information device 200 to the telephone communication network to enable a call using call unit 205. Radio communication unit 204 decodes a voice signal obtained by demodulating a radio signal received from a mobile phone base station and outputs the decoded signal to call unit 205. Radio communication unit 204 encodes voice input from call unit 205 and transmits the encoded signal to a mobile phone base station. Call unit 205 includes a microphone and a speaker. Voice input from radio communication unit 204 is output from the speaker, and voice input from the microphone is output to radio communication unit 204. Radio communication unit 204 is controlled by CPU 201, transmits/receives data through a mobile phone base station, and connects portable information device 200, for example, to the Internet. Portable information device 200 thus can communicate with a computer connected to the Internet through radio communication unit 204.

Display unit 206 is a display device such as an LCD (Liquid Crystal Display) or an organic ELD and displays, for example, instruction menus to the user and externally received data.

Camera 202 includes a lens and an optoelectronic transducer such as a CMOS (Complementary Metal Oxide Semiconductor) sensor, and light collected by the lens is imaged on the CMOS sensor. The CMOS sensor transduces the received light and outputs image data to CPU 201. A CCD (Charge Coupled Device) may be used in place of a CMOS sensor.

Camera 202 is arranged on the opposite surface to the surface having display unit 206 such that its optical axis is parallel to the normal to the display surface of display unit 206. Therefore, when an image captured by camera 202 is displayed on display unit 206, the user can set an imaging range of camera 202 while looking at the captured image displayed on display unit 206.

Operation unit 207 includes a plurality of keys and accepts input of a variety of instructions and data such as characters and numerals through user's operations corresponding to the keys. Operation unit 207 includes a touch panel 207A. Touch panel 207A detects a position designated by the user in the display surface of display unit 206. Touch panel 207A is provided on the top surface or the bottom surface of display unit 206 and outputs the coordinates of the position designated by the user to CPU 201. Touch panel 207A is a multi-touch screen panel and, if the user simultaneously designates a plurality of positions, outputs a plurality of coordinates corresponding to the positions designated by the user to CPU 201. Touch panel 207A preferably has a size equal to or larger than the display surface of display unit 206. Touch panel 207A is superimposed on display unit 206, so that when the user designates one or more positions on the display surface of display unit 206, touch panel 207A outputs one or more coordinates corresponding to the positions designated by the user in the display surface of display unit 206 to CPU 201. Touch panel 207A may be, for example, a resistive touch panel, a surface acoustic wave touch panel, an infrared touch panel, an electromagnetic inductive touch panel, or a capacitive touch panel, and any type can be used.

Wireless LAN I/F 208 is an interface that communicates with radio station 500 of a wireless LAN and connects portable information device 200 to LAN 2. Portable information device 200 can communicate with MFPs 100, 101, 102 and server 300 when wireless LAN I/F 208 communicates with radio station 500.

External storage device 209 is removably attached to portable information device 200. A CD-ROM 209A storing a remote operation program can be attached to external storage device 209. CPU 201 can access CD-ROM 209A through external storage device 209. CPU 201 can load the remote operation program recorded in CD-ROM 209A attached to external storage device 209 into the RAM of CPU 201 for execution.

The program recorded in flash memory 203 or CD-ROM 209A has been described as a program executed by CPU 201.

However, another computer connected to the Internet may overwrite the program stored in flash memory 203 or additionally write a new program. Portable information device 200 may download a program from another computer connected to the Internet. The program referred to here includes not only a program directly executable by CPU 201 but also a source program, a compressed program, and an encrypted program.

The program executed by CPU 201 may be stored not only in CD-ROM 209A but also in other medium such as an optical disk (MO/MD/DVD), an IC card, an optical card, and a semiconductor memory such as a mask ROM, an EPROM, and an EEPROM.

Short-range wireless communication unit 210 wirelessly communicates with one of MFPs 100, 101, 102 that resides in a communicable range. The communicable range of short-range wireless communication unit 210 is limited to a predetermined distance and preferably, but not limited to, a few meters. Short-range wireless communication unit 210 is not limited to a specific communication medium and, for example, wirelessly communicates via a communication standard such as the IrDA (Infrared Data Association) communication standard or Bluetooth (registered trademark). For example, when MFP 100 resides as the other party within a communicable distance range, short-range wireless communication unit 210 detects MFP 100 and becomes ready for communication with MFP 100.

GPS sensor 211 detects the present position of MFP 100, based on radio waves received from GPS (Global Positioning System) satellites. GPS sensor 211 outputs positional information indicating the detected present position to CPU 201.

Figure 3:
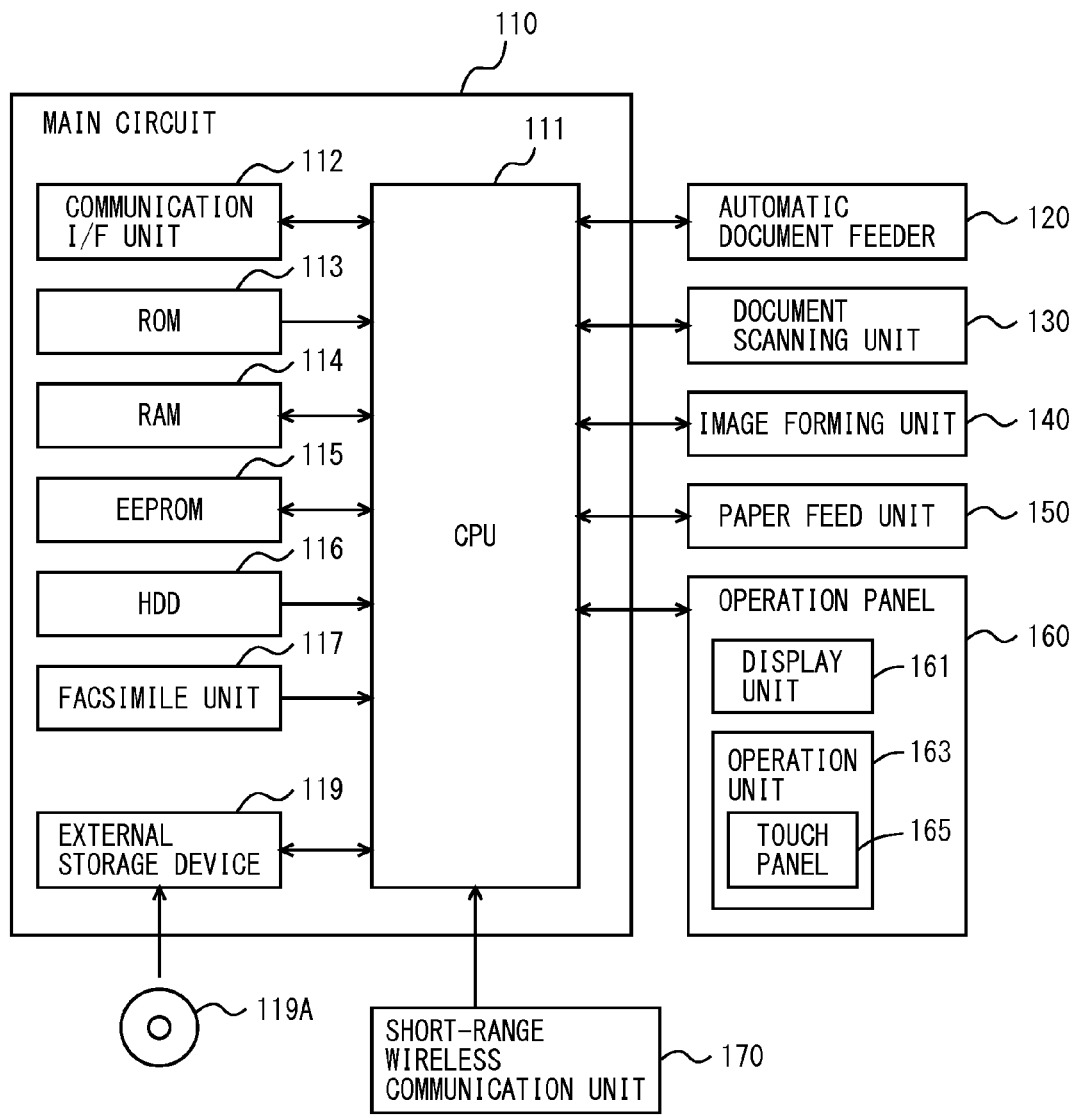
FIG. 3 is a block diagram showing an overall hardware configuration of an MFP in the first embodiment.

FIG. 3 is a block diagram showing an overall hardware configuration of the MFP in the first embodiment. Referring to FIG. 3, MFP 100 includes a main circuit 110, a document scanning unit 130 for scanning a document, an automatic document feeder 120 for conveying a document to document scanning unit 130, an image forming unit 140 for forming an image on paper or other medium based on image data output by document scanning unit 130 scanning a document, a paper feed unit 150 for supplying paper to image forming unit 140, an operation panel 160 serving as a user interface, and a short-range wireless communication unit 170.

Main circuit 110 includes a CPU 111, a communication interface (I/F) unit 112, a ROM 113, a RAM 114, and a hard disk drive (HDD) 115 as a mass storage device, a facsimile unit 116, and an external storage device 117 to which a CD-ROM 118 is attached. CPU 111 is connected to automatic document feeder 120, document scanning unit 130, image forming unit 140, paper feed unit 150, and operation panel 160 to control the entire MFP 100.

ROM 113 stores a program executed by CPU 111 or data necessary for executing the program. RAM 114 is used as a work area when CPU 111 executes a program. RAM 114 temporarily stores scan data (image data) successively sent from document scanning unit 130.

Operation panel 160 is provided on the top of MFP 100 and includes a display unit 161 and an operation unit 163. Display unit 161 is a display device such as a liquid crystal display (LCD) or an organic ELD (Electro-Luminescence Display) and displays instruction menus to the user or information about the acquired image data. Operation unit 163 includes a plurality of keys and accepts input of a variety of instructions and data such as characters and numerals through user's operations corresponding to the keys. Operation unit 163 further includes a touch panel provided on display unit 161.

Communication I/F unit 112 is an interface for connecting MFP 100 to network 2. CPU 111 communicates with MFPs 101, 102, PC 105 or portable information device 200 through communication I/F unit 112 to transmit/receive data. Communication I/F unit 112 can communicate with a computer connected to the Internet through network 2.

Facsimile unit 116 is connected to a Public Switched Telephone Network (PSTN) to transmit facsimile data to the PSTN or receive facsimile data from the PSTN. Facsimile unit 116 stores the received facsimile data into HDD 115 or outputs it to image forming unit 140. Image forming unit 140 prints the facsimile data received from facsimile unit 116 on paper. Facsimile unit 116 also converts data stored in HDD 115 into facsimile data and transmits the converted facsimile data to a facsimile machine connected to the PSTN.

CD-ROM (Compact Disk ROM) 118 is attached to external storage device 117. CPU 111 can access CD-ROM 118 through external storage device 117. CPU 111 loads the program recorded on CD-ROM 118 attached to external storage device 117 into RAM 114 for execution. The program executed by CPU 111 can be stored not only in CD-ROM 118 but also in other medium such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program executed by CPU 111 is not limited to a program recorded on CD-ROM 118. A program stored in HDD 115 may be loaded into RAM 114 for execution. In this case, another computer connected to network 2 may overwrite the program stored in HDD 115 of MFP 100 or additionally write a new program. MFP 100 may download a program from another computer connected to network 2 and store the program into HDD 115. The program referred to here includes not only a program directly executable by CPU 111 but also a source program, a compressed program, and an encrypted program.

Short-range wireless communication unit 170 communicates with portable information device 200 if portable information device 200 resides in a communicable range. The communicable range of short-range wireless communication unit 170 is limited to a predetermined distance. Short-range wireless communication unit 170 is not limited to a specific communication medium and wirelessly communicates via a communication standard such as the IrDA communication standard or Bluetooth (registered trademark). For example, when portable information device 200 resides as the other party in a communicable distance range, short-range wireless communication unit 170 detects portable information device 200 and becomes ready for communication with portable information device 200.

Figure 4:
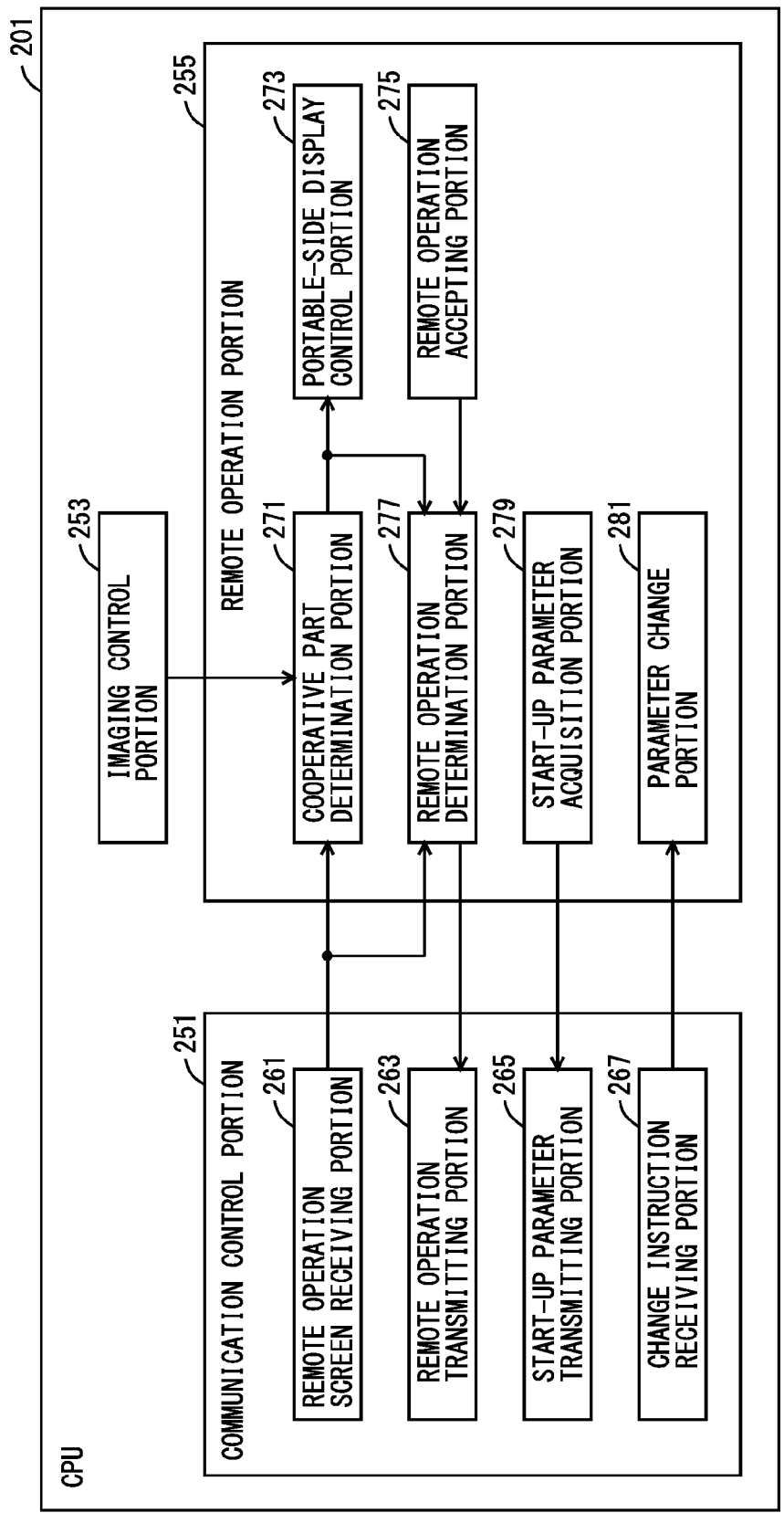
FIG. 4 is a block diagram showing an example of an overview of the functions of the CPU of the portable information device in the first embodiment.

FIG. 4 is a block diagram showing an example of an overview of the functions of the CPU of the portable information device in the first embodiment. The functions shown in FIG. 4 are formed in CPU 201 by CPU 201 of portable information device 200 executing a remote control program stored in flash memory 203 or CD-ROM 210A. Referring to FIG. 4, CPU 201 includes a communication control portion 251 for controlling short-range wireless communication unit 210, an imaging control portion 253 for controlling camera 202, and a remote operation portion 255 for controlling one of MFPs 100, 101, 102.

Imaging control portion 253 controls camera 202 to allow camera 202 to capture an image and accepts a captured image output by camera 202 imaging a subject. Here, the subject of camera 202 is MFP 100 to be remotely operated. Imaging control portion 253 outputs a captured image output by camera 202 to remote operation portion 255. Imaging control portion 253 allows camera 202 to image a subject and outputs captured images successively output by camera 202 to remote operation portion 255 while communication control portion 251 is establishing a communication path with MFP 100.

Communication control portion 251 controls short-range wireless communication unit 210. Communication control portion 251 establishes a communication path by negotiating with one of MFPs 100, 101, 102 that short-range wireless communication unit 210 becomes able to communicate with. For example, short-range wireless communication unit 210 becomes able to communicate with MFP 100 when MFP 100 is present in a range of distance in which short-range wireless communication unit 210 can communicate. In other words, when the distance between the user who operates portable information device 200 and MFP 100 comes within a predetermined distance, communication control portion 251 establishes a commination path with MFP 100. The negotiation may include authentication processing by MFP 100. For example, a user ID and a password registered beforehand in MFP 100 may be stored in flash memory 203 beforehand, and the user ID and the password are transmitted to MFP 100, so that a communication path is established on condition that authentication is successful in MFP 100. An example in which communication control portion 251 establishes a communication path with MFP 100 will be described.

Communication control portion 251 includes a remote operation screen receiving portion 261, a remote operation transmitting portion 263, a start-up parameter transmitting portion 265, and a change instruction receiving portion 267. Remote operation portion 255 includes a cooperative part determination portion 271, a portable-side display control portion 273 for controlling display unit 206, a remote operation accepting portion 275 for controlling operation unit 207, a remote operation determination portion 277, a start-up parameter acquisition portion 279, and a parameter change portion 281.

Remote operation screen receiving portion 261 acquires a remote operation screen received by short-range wireless communication unit 210 from MFP 100 and outputs the acquired remote operation screen to cooperative part determination portion 271 and remote operation determination portion 277. MFP 100 transmits a remote operation screen at timing immediately after establishing a communication path with portable information device 200 and after receiving a remote operation for switching screens, among remote operations described later. Short-range wireless communication unit 210 may receive positional information from MFP 100 together with a remote operation screen. Remote operation screen receiving portion 261 acquires the positional information received together with a remote operation screen and outputs the remote operation screen and the positional information to cooperative part determination portion 271 and remote operation determination portion 277.

Cooperative part determination portion 271 receives a remote operation screen from remote operation screen receiving portion 261 and receives a captured image from imaging control portion 253. Cooperative part determination portion 271 analyzes the captured image and detects a relative position to MFP 100. If the captured image includes at least part of MFP 100 as a subject, the relative position to display unit 161 of MFP 100 is determined from the subject. For example, if the captured image includes the entire display surface of display unit 161 at the center, the relative position of camera 202 to display unit 161 is above the display surface of display unit 161. If the captured image includes part of MFP 100 that is disposed on the right side of the display surface of display unit 161, the relative position of camera 202 to display unit 161 is to the right of the display surface of display unit 161.

Cooperative part determination portion 271 determines one of a normal mode and a cooperation mode as a display mode. Cooperative part determination portion 271 detects a relative position in which the relative position to display unit 161 has a predetermined relation, from the captured image. If detecting a relative position in which the relative position to display unit 161 has a predetermined relation, cooperative part determination portion 271 determines the cooperation mode as a display mode. If detecting a relative position in which the relative position to display unit 161 does not have a predetermined relation, cooperative part determination portion 271 determines the normal mode as a display mode. When determining the cooperation mode as a display mode, cooperative part determination portion 271 determines part of the remote operation screen as a display image. When determining the normal mode as a display mode, cooperative part determination portion 271 determines the entire remote operation screen as a display image. Cooperative part determination portion 271 outputs the display image to portable-side display control portion 273 and remote operation determination portion 277.

Portable-side display control portion 273 controls display unit 206 to display a display image input from cooperative part determination portion 271 on display unit 206. Remote operation accepting portion 275 controls touch panel 207A to detect a position designated by the user in the display surface of display unit 206. Remote operation accepting portion 269 outputs positional information indicating the detected position in the display surface to remote operation determination portion 277.

When cooperative part determination portion 271 determines the cooperation mode as a display mode, a remote operation screen and positional information are input from remote operation screen receiving portion 261. The positional information indicates the position of a part of the remote operation screen that is displayed on display unit 161 by MFP 100. Cooperative part determination portion 271 determines a part of the remote operation screen that is to be determined as a display image, from the positional information and the relative position to display unit 161. For example, when portable information device 200 is located immediately above display unit 161, the part of the remote operation screen that is specified by the positional information is determined as a display image. Although portable information device 200 hides the image appearing on display unit 161 of MFP 100, the same display image appears on display unit 206. When portable information device 200 is located to the right of display unit 161, the part to the right of the part of the remote operation screen that is specified by the positional information is determined as a display image. The part of the operation screen that is displayed on display unit 161 of MFP 100 and the display image that is displayed on display unit 206 of portable information device 200 appear in a connected state.

Remote operation determination portion 277 receives a remote operation screen from remote operation screen receiving portion 261, receives a display image from cooperative part determination portion 271, and receives positional information from remote operation accepting portion 275. Remote operation determination portion 277 determines a remote operation and outputs the determined remote operation to remote operation transmitting portion 263. Remote operation determination portion 277 specifies the position in the display image based on the positional information input from remote operation accepting portion 275 and the display image input from cooperative part determination portion 271 and specifies the position in the remote operation screen from the display image and the remote operation screen input from remote operation screen receiving portion 261. The remote operation including the positional information indicating the position specified in the remote operation screen is then output to remote operation transmitting portion 263.

Remote operation transmitting portion 263 transmits the remote operation to MFP 100 through short-range wireless communication unit 210, in response to input of the remote operation from remote operation determination portion 277.

Start-up parameter acquisition portion 279 acquires a parameter set in display unit 206 at the start of remote control and outputs the acquired parameter to start-up parameter transmitting portion 265. The start of remote control is a point of time when communication control portion 251 establishes communication with MFP 100. The parameter set in display unit 206 is a parameter that defines a color displayed by display unit 206, for example, a parameter that defines a color temperature. The parameter set in display unit 206 is hereinafter represented by the unit K (Kelvin) of color temperature.

Start-up parameter transmitting portion 265 transmits the parameter to MFP 100 through short-range wireless communication unit 210 in response to input of the parameter from start-up parameter acquisition portion 279.

When short-range wireless communication unit 210 receives a change instruction from MFP 100, change instruction receiving portion 267 acquires the change instruction and outputs the acquired change instruction to parameter change portion 281. In response to input of the change instruction from change instruction receiving portion 267, parameter change portion 281 changes the parameter set in display unit 206 with the parameter included in the change instruction. Display unit 206 thus changes the image in accordance with the changed parameter, so that the display image is displayed with a color temperature defined by the parameter included in the change instruction.

Figure 5:
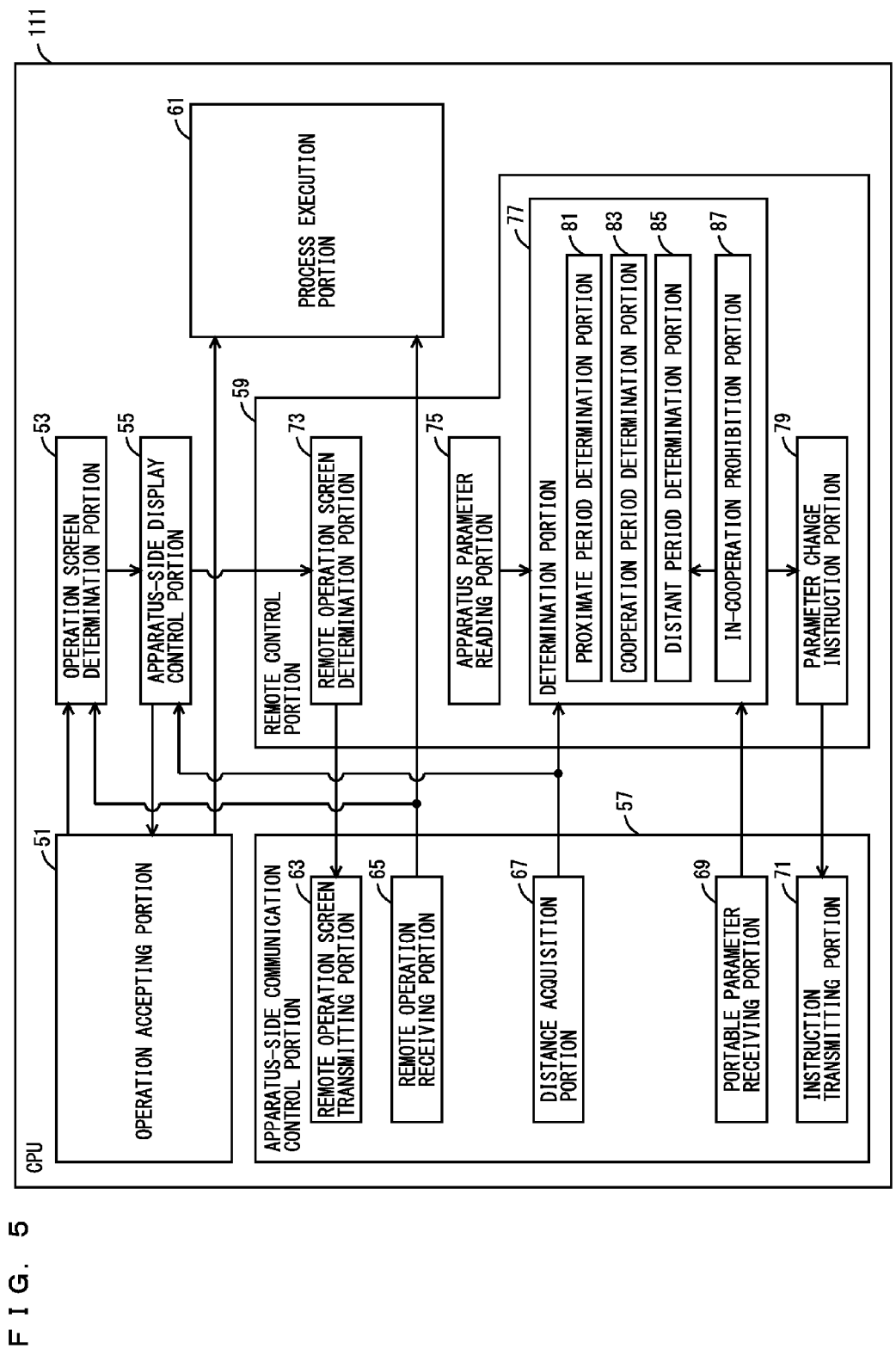
FIG. 5 is a block diagram showing an overview of the functions of the CPU of the MFP in the first embodiment.

FIG. 5 is a block diagram showing an overview of the functions of the CPU of the MFP in the first embodiment. The functions shown in FIG. 5 are formed in CPU 111 by CPU 111 of MFP 100 executing a remote control program stored in ROM 113, HDD 115, or CD-ROM 118. Referring to FIG. 5, CPU 111 includes an operation accepting portion 51 for accepting an operation by the user, an operation screen determination portion 53 for determining an operation screen, an apparatus-side display control portion 55 for controlling display unit 161, an apparatus-side communication control portion 57 for controlling short-range wireless communication unit 170, a remote control portion 59 remotely controlled by a remote operation device, and a process execution portion 61 for executing a process.

Operation accepting portion 51 accepts an operation input by the user to operation unit 163. The operations accepted by operation accepting portion 51 include a screen transition operation to change operation screens and an instruction operation to give an instruction to execute a process. A plurality of operation screens are stored in advance in HDD 115, and the operation screens are associated with each other. The operation screens each have a transition button to make a transition to another operation screen. Operation accepting portion 51 accepts a screen transition operation when operation unit 163 accepts an operation to designate a transition button. When accepting a screen transition operation, operation accepting portion 51 outputs the screen transition operation to operation screen determination portion 53. When accepting an instruction operation, operation accepting portion 51 outputs the instruction operation to process execution portion 61.

In response to input of a screen transition operation from operation accepting portion 51, operation screen determination portion 53 determines an operation screen associated with the transition button specified by the screen transition operation and outputs screen identification information for identifying the determined operation screen to apparatus-side display control portion 55.

Apparatus-side display control portion 55 controls display unit 161 and, in response to input of screen identification information from operation screen determination portion 53, reads out the operation screen specified by the screen identification information from HDD 115 to display the read operation screen on display unit 161, and outputs the screen identification information to the remote control portion.

In response to input of an instruction operation from operation accepting portion 51, process execution portion 61 executes a process specified by the instruction operation. The processes executed by process execution portion 61 include an image forming process of forming an image by controlling image forming unit 140, a document scanning process of scanning a document image by controlling document scanning unit 130, a data transmission/reception process of transmitting/receiving data by controlling communication I/F unit 112, a facsimile transmission/reception process of transmitting/receiving facsimile data by controlling facsimile unit 116, and a data management process of writing data or reading data by controlling HDD 115 or external storage device 117.

Apparatus-side communication control portion 57 controls short-range wireless communication unit 170. Apparatus-side communication control portion 57 allows short-range wireless communication unit 170 to establish a communication path with portable information device 200 when short-range wireless communication unit 170 becomes able to communicate with portable information device 200. Short-range wireless communication unit 170 is able to communicate with portable information device 200, for example, when portable information device 200 resides in a range of distance in which short-range wireless communication unit 170 can communicate. In other words, when the distance between the user who operates portable information device 200 and MFP 100 becomes a predetermined distance, short-range wireless communication unit 170 is allowed to establish a communication path with portable information device 200.

Apparatus-side communication control portion 57 includes a remote operation screen transmitting portion 63, a remote operation receiving portion 65, a distance acquisition portion 67, a portable parameter receiving portion 69, and an instruction transmitting portion 71. Remote control portion 59 includes a remote operation screen determination portion 73, an apparatus parameter reading portion 75, a determination portion 77, and a parameter change instruction portion 79. Remote operation screen determination portion 73 receives screen identification information of an operation screen from apparatus-side display control portion 55 and determines a remote operation screen corresponding to the operation screen specified by the screen identification information. The remote operation screen may be the same screen as the operation screen or may be a screen associated with the operation screen in advance. The screen associated with the operation screen in advance includes, for example, a help screen that presents information for explaining the operation corresponding to the operation screen. Remote operation screen determination portion 73 outputs the determined remote operation screen to remote operation screen transmitting portion 63.

In response to input of a remote operation screen from remote operation screen determination portion 73, remote operation screen transmitting portion 63 transmits the remote operation screen to portable information device 200 through short-range wireless communication unit 170.

When the short-range wireless communication unit 170 receives a remote operation from portable information device 200, remote operation receiving portion 65 acquires the received remote operation. The remote operation includes a screen transition operation to change operation screens and an instruction operation to give an instruction to execute a process. If the remote operation includes positional information indicating a position in the transition button in the remote operation screen, remote operation receiving portion 65 accepts a screen transition operation. When a remote operation of a screen transition operation is acquired, remote operation receiving portion 65 outputs the screen transition operation to operation screen determination portion 53. When an instruction operation is accepted, remote operation receiving portion 65 outputs the instruction operation to process execution portion 61.

Distance acquisition portion 67 acquires the distance to portable information device 200. Distance acquisition portion 67 calculates the distance to portable information device 200 based on the intensity of radio waves received by short-range wireless communication unit 170 from portable information device 200. Distance acquisition portion 67 outputs the acquired distance to determination portion 77.

Apparatus parameter reading portion 75 reads out a parameter set in display unit 161 and outputs the read parameter to determination portion 77. The parameter set in display unit 161 is a parameter that defines the color to be displayed by display unit 161, for example, a parameter that defines a color temperature. The parameter set in display unit 161 is hereinafter represented in the unit K (Kelvin) of color temperature.

Portable parameter receiving portion 69 acquires a parameter received by short-range wireless communication unit 170 from portable information device 200. The parameter received from portable information device 200 is a parameter set in display unit 206 of portable information device 200 at the start of remote control. Portable parameter receiving portion 69 outputs the parameter received from portable information device 200 to determination portion 77.

Determination portion 77 receives the distance to portable information device 200 from distance acquisition portion 67, receives the parameter set in display unit 161 from apparatus parameter reading portion 75, and receives the parameter set in display unit 206 of portable information device 200 at the start of remote operation from portable parameter receiving portion 69. The parameter set in display unit 161 is hereinafter referred to as an apparatus parameter, and the parameter set in display unit 206 of portable information device 200 at the start of remote operation is referred to as a portable parameter, for the sake of explanation. The distance to portable information device 200 that is acquired by distance acquisition portion 67 at the start of remote operation is referred to as start-up distance LS. The distance at which portable information device 200 sets the cooperation mode as a display mode is referred to as cooperation distance LC.

Determination portion 77 determines an update parameter in accordance with the distance to portable information device 200 and outputs the determined update parameter to parameter change instruction portion 79. At start-up distance LS, display unit 206 of portable information device 200 is set in the portable parameter.

Determination portion 77 determines one of a proximate period, a distant period, and a cooperation period, based on the distance to portable information device 200 that is input from distance acquisition portion 67. Determination portion 77 includes a proximate period determination portion 81, a cooperation period determination portion 83, a distant period determination portion 85, and an in-cooperation prohibition portion 87. Determination portion 77 determines, as the proximate period, a period from the start of remote operation until the distance to portable information device 200 becomes cooperation distance LC (the first distance), in a period from the start of remote operation to the end of remote operation. Determination portion 77 determines, as the distant period, a period from when the distance to portable information device 200 becomes cooperation distance LC to when the distance becomes longer than cooperation distance LC until the remote operation ends, in a period from the start of remote operation to the end of remote operation.

Cooperation period determination portion 83 determines the same value as the apparatus parameter, as an update parameter, in the cooperation period in which the distance to portable information device 200 is equal to or smaller than cooperation distance LC. Letting the portable parameter be PM, the apparatus parameter be PD, and the distance to portable information device 200 be distance LX, update parameter PU(LX) for distance LX in the cooperation period is given by Equation (1) below.

$$PU(LX)=PD\ (LX<LC) \tag{1}$$

Proximate period determination portion 81 determines an update parameter in the proximate period in which portable information device 200 comes closer to MFP 100. Proximate period determination portion 81 determines, as the value of the update parameter, a value closer to the apparatus parameter as the distance to portable information device 200 decreases, until the update parameter has the same value as the apparatus parameter. The update parameter PU(LX) for distance LX in the proximate period is given by Equation (2) below.

$$PU(LX)=(PM-PD)/(LS-LC)\times(LX-LC)+PD\ (LX\geq LC) \tag{2}$$

Distant period determination portion 85 determines an update parameter in the distant period in which portable information device 200 goes away from MFP 100. Distant period determination portion 85 determines, as the update parameter, a value closer to the portable parameter at the start of remote operation as the distance to portable information device 200 increases, until the update parameter has the same value as the portable parameter. In-cooperation prohibition portion 87 prohibits distant period determination portion 85 determining the update parameter in the distant period until the distance to portable information device 200 becomes equal to or longer than prohibitive distance LI (the second distance) longer than cooperation distance LC. Update parameter PU(LX) for distance LX in the distant period is given by Equation (3) below.

$$PU(LX)=(PM-PD)/(LS-LI)\times(LX-LI)+PD\ (LX\geq LC) \tag{3}$$

In response to input of the update parameter from determination portion 77, parameter change instruction portion 79 outputs a transmission instruction including the update parameter to instruction transmitting portion 71. In response to input of a transmission instruction from parameter change instruction portion 79, instruction transmitting portion 71 transmits a change instruction including the update parameter included in the transmission instruction to portable information device 200 through short-range wireless communication unit 170.

Apparatus-side display control portion 55 may receive the distance to portable information device 200 from distance acquisition portion 67. If the distance to portable information device 200 that is input from distance acquisition portion 67 is equal to or smaller than cooperation distance LC, apparatus-side display control portion 55 determines that portable information device 200 is in the cooperation mode. If it is determined that portable information device 200 is in the cooperation mode and the remote operation screen is the same as the operation screen, apparatus-side display control portion 55 displays part of the operation screen on display unit 161 and outputs the screen identification of the operation screen and positional information indicating the position in the operation screen of the part displayed on display unit 161, to remote operation screen determination portion 73. A notice indicating that the portable information device is in the cooperation mode may be given from portable information device 200. In this case, since the determination based on the distance to portable information device 200 is not required, the distance to portable information device 200 does not have to be input from distance acquisition portion 67.

When the screen identification of the operation screen and the positional information are input from apparatus-side display control portion 55, remote operation screen determination portion 73 determines the same screen as the operation screen specified by the screen identification information, as a remote operation screen. Remote operation screen determination portion 73 outputs the determined remote operation screen and the positional information to remote operation screen transmitting portion 63. When the remote operation screen and the positional information are input from remote operation screen determination portion 73, remote operation screen transmitting portion 63 transmits the remote operation screen and the positional information to portable information device 200 through short-range wireless communication unit 170.

FIG. 6 is a graph illustrating an example of the relation between the distance between the portable information device and the MFP, and the update parameter. Referring to FIG. 6, the horizontal axis shows the distance between portable information device 200 and MFP 100, and the vertical axis shows the update parameter set in display unit 206. The solid line shows the update parameter in a period in which the user comes close to MFP 100, and the dotted line shows the update parameter in a period in which the user goes away from MFP 100.

In the proximate period in which the user comes close to MFP 100, distance LX between portable information device 200 and MFP 100 changes from start-up distance LS to cooperation distance LC. In the proximate period, the update parameter is given by Equation (2) above, and the update parameter set in display unit 206 is a value proportional to distance LX between portable information device 200 and MFP 100, in a range equal to greater than apparatus parameter PD and equal to or smaller than portable parameter PM. Therefore, as the user comes closer to MFP 100, the color of the remote operation screen appearing on portable information device 200 comes closer to the color of the operation screen appearing on display unit 161 of MFP 100. Since the color of the remote operation screen does not change abruptly, the user is unlikely to be aware of the color change.

When distance LX between portable information device 200 and MFP 100 is equal to or smaller than cooperation distance LC, the update parameter given by Equation (1) above and set in display unit 206 has the same value as apparatus parameter PD, irrespective of distance LX between portable information device 200 and MFP 100.

Therefore, in the cooperation mode in which portable information device 200 operated by the user cooperates with MFP 100, the color of the remote operation screen displayed on portable information device 200 is identical with the color of the operation screen displayed on display unit 161 of MFP 100. This processing allows the user to recognize the colors displayed on the two screens to be identical. In particular, when the operation screen is a preview screen for displaying a printed image, the color close to the color of the actually printed image is displayed on MFP 100 and on portable information device 200, thereby allowing the user to readily confirm the printed color. When part of the operation screen is related to part of the remote operation screen by color, the user can view the corresponding part between the operation screen and the remote operation screen, in an identical color.

In the distant period in which the user goes away from MFP 100, distance LX between portable information device 200 and MFP 100 changes from cooperation distance LC to start-up distance LS. In the distant period, the same value as apparatus parameter PD is kept without determining the update parameter until distance LX between portable information device 200 and MFP 100 becomes prohibitive distance LI. With distance LX between portable information device 200 and MFP 100 equal to or greater than prohibitive distance LI, the update parameter is given by Equation (3) above, and the update parameter set in display unit 206 is a value proportional to distance LX between portable information device 200 and MFP 100 in a range equal to or greater than apparatus parameter PD and equal to or smaller than portable parameter PM.

Therefore, as the user goes away from MFP 100, the color of the remote operation screen displayed on portable information device 200 changes from the color identical with the color of the operation screen displayed on display unit 161 of MFP 100 to the color before the remote operation. Since the color of the remote operation screen does not change abruptly, the user is less likely to be aware of the color change. In the distant period, the color of the remote operation screen does not change until the distance increases to prohibitive distance LI, and this processing can cope with the case where the user moves away from MFP 100 and comes closer to MFP 100 again.

Figure 7:
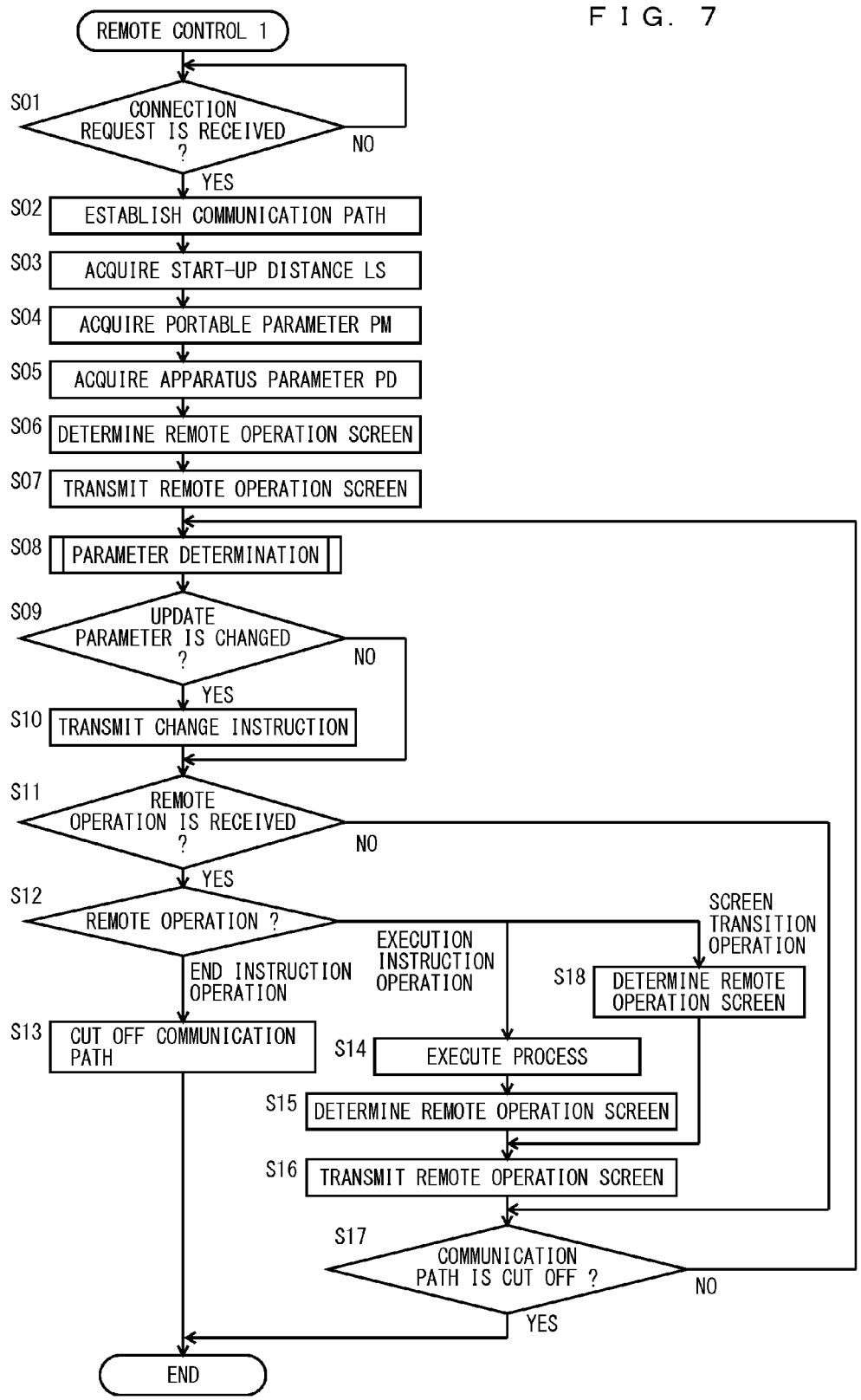
FIG. 7 is a flowchart showing an example of the procedure of a remote control process in the first embodiment.

FIG. 7 is a flowchart showing an example of the procedure of a remote control process in the first embodiment. The remote control process is a process executed by CPU 111 of MFP 100 when CPU 111 executes a remote control program stored in ROM 113, HDD 116, or CD-ROM 119A.

Referring to FIG. 7, CPU 111 determines whether a connection request has been received (step S01). It is determined whether short-range wireless communication unit 170 has detected portable information device 200 and received a connection request from portable information device 200. The process waits until a connection request is received (NO in step S01). If a connection request has been received (YES in step S01), the process proceeds to step S02.

In step S02, a communication path with portable information device 200 is established. Start-up distance LS is then acquired (step S03). The distance corresponding to the intensity of radio waves received by short-range wireless communication unit 170 from portable information device 200 is calculated and set as start-up distance LS. In the next step S04, a portable parameter is acquired. When establishing a communication path with MFP 100, portable information device 200 transmits the parameter set in display unit 206 at that time, and the parameter received by short-range wireless communication unit 170 from portable information device 200 is acquired as a portable parameter. The portable parameter has the value of the parameter set in display unit 206 of portable information device 200 at the time when the remote operation starts. In the next step S05, an apparatus parameter is acquired. The parameter set in display unit 161 is acquired as an apparatus parameter.

A remote operation screen is then determined (step S06). The remote operation screen corresponding to the operation screen appearing on display unit 161 at the stage when step S06 is performed is determined. In the next step S07, the remote operation screen determined in step S06 is transmitted to portable information device 200 through short-range wireless communication unit 170.

In the next step S08, a parameter determination process is performed. The parameter determination process, which will be detailed later, is a process of determining an update parameter for updating the parameter set in display unit 206 of portable information device 200. It is then determined whether the update parameter has been changed through the parameter determination process (step S09). If the update parameter has been changed, the process proceeds to step S10. If not, the process proceeds to step S11.

In step S10, an update instruction is transmitted to portable information device 200 through short-range wireless communication unit 170, and the process proceeds to step S11. The update instruction includes the update parameter determined in step S08 and includes a command to give an instruction to update the parameter set in display unit 206 of portable information device 200.

In step S11, it is determined whether a remote operation has been received. If short-range wireless communication unit 170 has received a remote operation from portable information device 200, the process proceeds to step S12. If not, the process proceeds to step S17. In step S12, the process branches depending on the kind of the remote operation. If the remote operation is an end instruction operation to give an instruction to terminate the remote control, the process proceeds to step S13. If the remote operation is an execution instruction operation to give an instruction to execute a process, the process proceeds to step S14. If the remote operation is a screen transition operation to give an instruction to switch remote operation screens, the process proceeds to step S18. In step S13, the communication path established in step S02 is cut off, and the process ends.

In step S14, the process specified by execution instruction operation is performed, and the process proceeds to step S15. A remote operation screen is then determined (step S15), and the process proceeds to step S16. The operation screen to be displayed on display unit 161 is determined after the process specified by the execution instruction operation is performed, and the remote operation screen corresponding to the determined operation screen is determined.

On the other hand, in step S18, a remote operation screen is determined based on the screen transition operation, and the process proceeds to step S16. The operation screen specified by the screen transition operation is determined, and the remote operation screen corresponding to the determined operation screen is determined. The determined operation screen appears on display unit 161.

In step S16, the remote operation screen determined in step S15 or step S18 is transmitted to portable information device 200 through short-range wireless communication unit 170, and the process proceeds to step S17. In step S17, it is determined whether the communication path established in step S02 has been cut off. The cut-off includes a case where the communication path is cur off by portable information device 200 and a case where noise or other causes disable short-range wireless communication unit 170 to communicate with portable information device 200. If the communication path has been cut off, the process ends. If not, the process returns to step S08.

Figure 8:
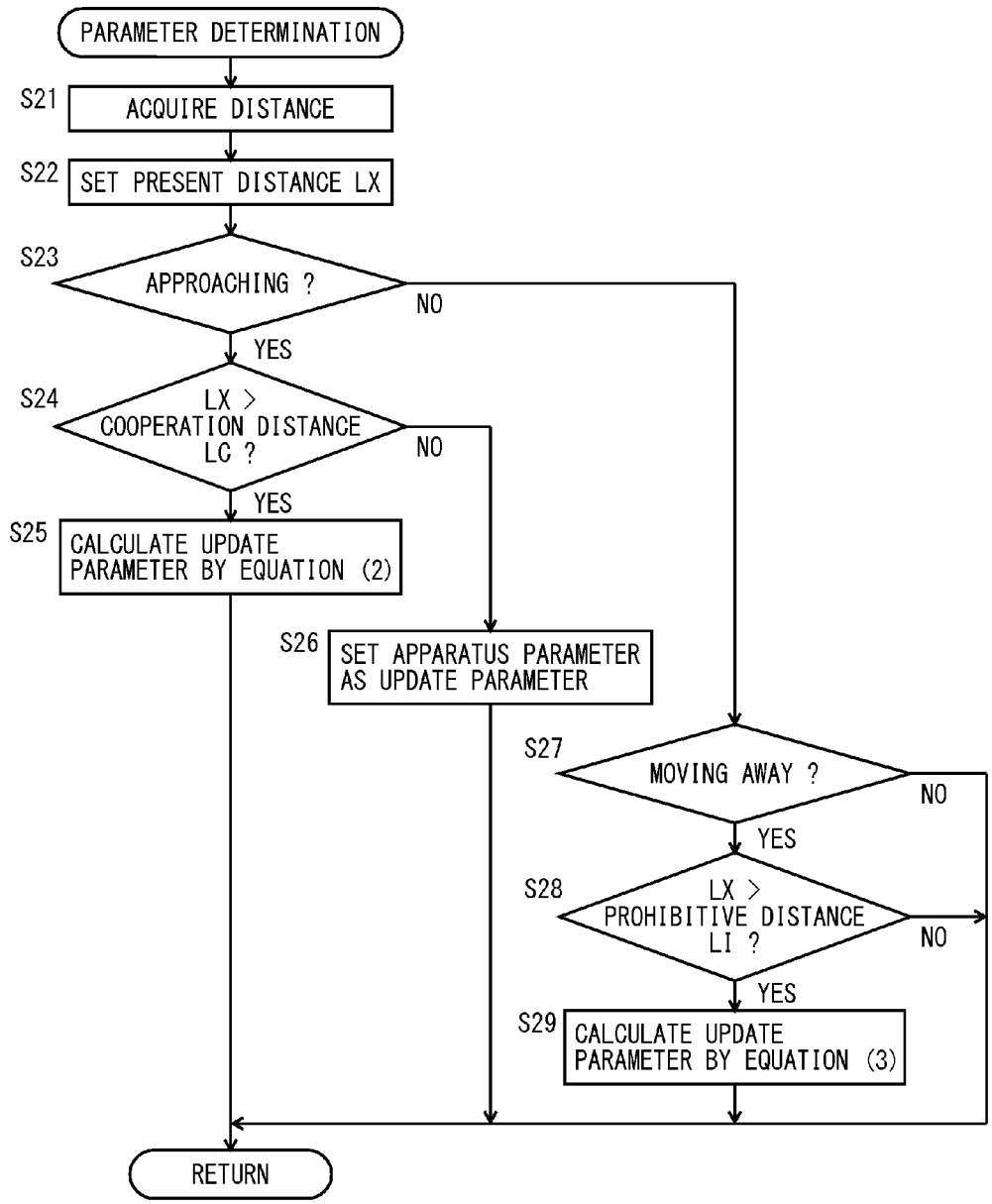
FIG. 8 is a flowchart showing an example of the procedure of a parameter determination process in the first embodiment.

FIG. 8 is a flowchart showing an example of the procedure of the parameter determination process in the first embodiment. The parameter determination process in the first embodiment is a process executed in step S08 in FIG. 7. Referring to FIG. 8, CPU 111 acquires the distance to portable information device 200 (step S21). Based on the radio waves received by short-range wireless communication unit 170 from portable information device 200 at the stage when step S21 is performed, the distance corresponding to the intensity of the radio waves is calculated. In the next step S22, the acquired distance is set as present distance LX.

In the next step S23, it is determined whether portable information device 200 is approaching. The distance acquired in step S21 is compared with the distance acquired in the past, and if the distance is shorter, it is determined that portable information device 200 is approaching. If approaching, the process proceeds to step S24. If not, the process proceeds to step S27.

In step S24, it is determined whether present distance LX is greater than cooperation distance LC. If present distance LX is greater than cooperation distance LC, the process proceeds to step S26. If not, the process proceeds to step S26.

In step S26, apparatus parameter PD is set as an update parameter, and the process returns to the remote control process. The color temperature of the image displayed on display unit 206 thus becomes equal to the color temperature of the image displayed on display unit 161 of MFP 100, so that the user can see the two images having the same color temperature without feeling uncomfortable. In the cooperation period in which the distance between portable information device 200 and MFP 100 is equal to or smaller than cooperation distance LC, portable information device 200 operates in the cooperation mode. In particular when portable information device 200 is in the cooperation mode, part of the operation screen may be displayed on display unit 161 of MFP 100 and part of the remote operation screen identical with the operation screen may be displayed on display unit 206 of portable information device 200. In the cooperation period, part of the operation screen is displayed on display unit 161 of MFP 100, and, in this case, the color temperature of part of the operation screen displayed on display unit 161 of MFP 100 is equalized with the color temperature of part of the remote operation screen displayed on display unit 206 of portable information device 200, so that the user can view the two images without feeling uncomfortable.

In step S25, the update parameter is calculated according to Equation (2) above using present distance LX set in step S22, and the process returns to the remote control process.

In step S27, it is determined whether portable information device 200 is moving away. The distance acquired in step S21 is compared with the distance acquired in the past, and if the distance is longer, it is determined that portable information device 200 is moving away. If moving away, the process proceeds to step S28. If not, the process returns to the remote control process.

In step S28, it is determined whether present distance LX is greater than prohibitive distance LI. If present distance LX is greater than prohibitive distance LI, the process proceeds to step S29. If not, the process returns to the remote control process. Since prohibitive distance LI is longer than cooperation distance LC, even when the user goes away from MFP 100 by a distance longer than cooperation distance LC while using portable information device 200 in the cooperation mode, if the distance is within prohibitive distance LI, the apparatus parameter is kept without determining an update parameter. Therefore, for example, when the user goes away from MFP 100 by a distance longer than cooperation distance LC while using portable information device 200 in the cooperation mode and comes close to MFP 100 again, the color temperature of the image displayed on display unit 206 is not changed, thereby preventing the user from feeling uncomfortable due to the changing color temperature of the image.

In step S29, the update parameter is calculated according to Equation (3) above using present distance LX set in step S22, and the process returns to the remote control process. If present distance LX is greater than cooperation distance LC and smaller than start-up distance LS, the color temperature of the image displayed on display unit 206 of portable information device 200 gradually changes in proportion to the distance between portable information device 200 and MFP 100, so that the user does not become aware of the changing color temperature of the image.

If the distance between portable information device 200 and MFP 100 is greater than start-up distance LS, the user of portable information device 200 may operate in the normal mode in which MFP 100 is remotely operated. In this case, the user of portable information device 200 does not view display unit 161 of MFP 100. Therefore, display unit 206 can return to the state before MFP 100 is remotely controlled by portable information device 200.

Figure 9:
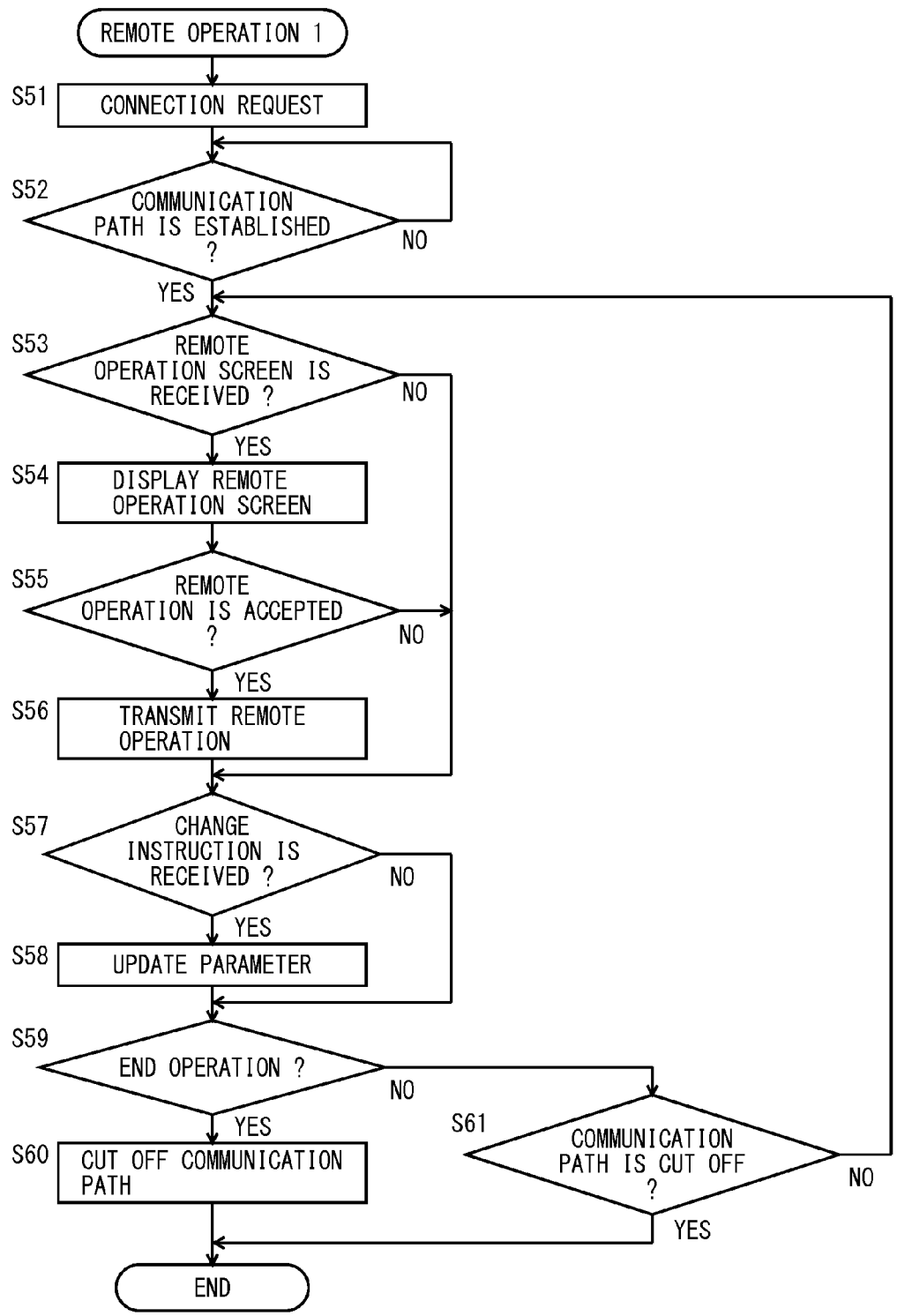
FIG. 9 is a flowchart showing an example of the procedure of a remote operation process in first embodiment.

FIG. 9 is a flowchart showing an example of the procedure of the remote operation process in the first embodiment. The remote operation process is a process performed by CPU 201 of portable information device 200 when CPU 201 executes a remote operation program stored in flash memory 203. Referring to FIG. 9, CPU 201 transmits a connection request (step S51). A connection instruction given by the user to operation unit 207 to specify a destination device is accepted. Here, MFP 100 is specified as a destination device, by way of example. A connection request is transmitted to MFP 100 specified as a destination device through short-range wireless communication unit 210.

In step S52, it is determined whether short-range wireless communication unit 210 has established a communication path with MFP 100. When MFP 100 resides in a communicable range, short-range wireless communication unit 210 establishes a communication path by negotiating with MFP 100. If a communication path has been established, the process proceeds to step S53. If not, the process ends. If a communication path fails to be established, preferably, for example, a message indicating the failure in connection is displayed for the user.

When a communication path with portable information device 200 is established, MFP 100 transmits a remote operation screen to portable information device 200. In step S53, it is determined whether short-range wireless communication unit 210 has received a remote operation screen from MFP 100. If a remote operation screen has been received, the process proceeds to step S54. If not, the process proceeds to step S57.

In step S54, the remote operation screen is displayed on display unit 206. In this case, if the display mode is the normal mode, the entire remote operation screen is displayed on display unit 206. If the display mode is the cooperation mode, part of or the whole of the remote operation screen is displayed on display unit 206. If the image obtained by camera 202 imaging a subject includes display unit 161 of MFP 100 or the surroundings thereof, the display mode is set to the cooperation mode. If the image obtained by camera 202 imaging a subject does not include display unit 161 of MFP 100 or the surroundings thereof, the display mode is set to the normal mode.

In step S55, it is determined whether a remote operation has been accepted. If the user designates a position in the remote operation screen appearing on display unit 206, it is determined that the designated position is detected as a remote operation by touch panel 207A. If a remote operation has been accepted, the process proceeds to step S56. If not, the process proceeds to step S57. In step S56, the remote operation is transmitted to MFP 100 through the communication path established in step S52, and the process proceeds to step S57. The remote operation includes positional information indicating the position in the remote operation screen that is determined based on the position detected in step S55.

In step S57, it is determined whether a change instruction has been received from MFP 100. It is determined whether short-range wireless communication unit 210 has received a change instruction from MFP 100 through the communication path established in step S52. If a change instruction has been received, the process proceeds to step S58. If not, the process proceeds to step S59.

In step S58, the parameter set in display unit 206 is updated with the update parameter included in the change instruction, and the process proceeds to step S59. The color temperature of the image displayed on display unit 206 is thus changed.

In step S59, it is determined whether an end instruction has been accepted. If an end instruction has been accepted, the process proceeds to step S60. If not, the process proceeds to step S61. In step S60, the communication path established in step S52 is cut off, and the process ends. In step S61, it is determined whether the communication path established in step S52 has been cut off. The cut-off includes a case where the communication path is cut off by MFP 100 and a case where noise or other causes disable short-range wireless communication unit 210 to communicate with MFP 100. If the communication path has been cut off, the process ends. If not, the process returns to step S53.

As described above, MFP 100 in the first embodiment displays an operation screen on display unit 161 and transmits the remote operation screen related to the operation screen to portable information device 200 and allows display unit 206 to display it. MFP 100 determines an update parameter, based on the distance LX to portable information device 200, the portable parameter that is a parameter set in display unit 206 at the time when the remote operation starts, and the apparatus parameter that is the parameter set in display unit 161, and allows the parameter set in display unit 206 to be updated with the update parameter. The color of the remote operation screen displayed on display unit 206 thus can be changed. As a result, the colors of the images displayed on portable information device 200 and on MFP 100 can be equalized. The color is gradually changed as the distance to MFP 100 decreases, thereby preventing the user from feeling uncomfortable due to the color rapidly changing.

<Second Embodiment>

In cooperation system 1 in the first embodiment, an update parameter is determined in MFP 100. In cooperation system 1A in a second embodiment, portable information device 200 determines an update parameter. The difference of cooperation system 1A in the second embodiment from cooperation system 1 in the first embodiment will be mainly described.

The overall configuration of cooperation system 1A in the second embodiment is the same as the overall configuration of cooperation system 1 in the first embodiment shown in FIG. 1. The hardware configuration of portable information device 200 in the second embodiment is the same as the hardware configuration shown in FIG. 2. The hardware configuration of each MFP 100, 101, 102 in the second embodiment is also the same as the hardware configuration shown in FIG. 3. A description thereof is not repeated here.

Figure 10:
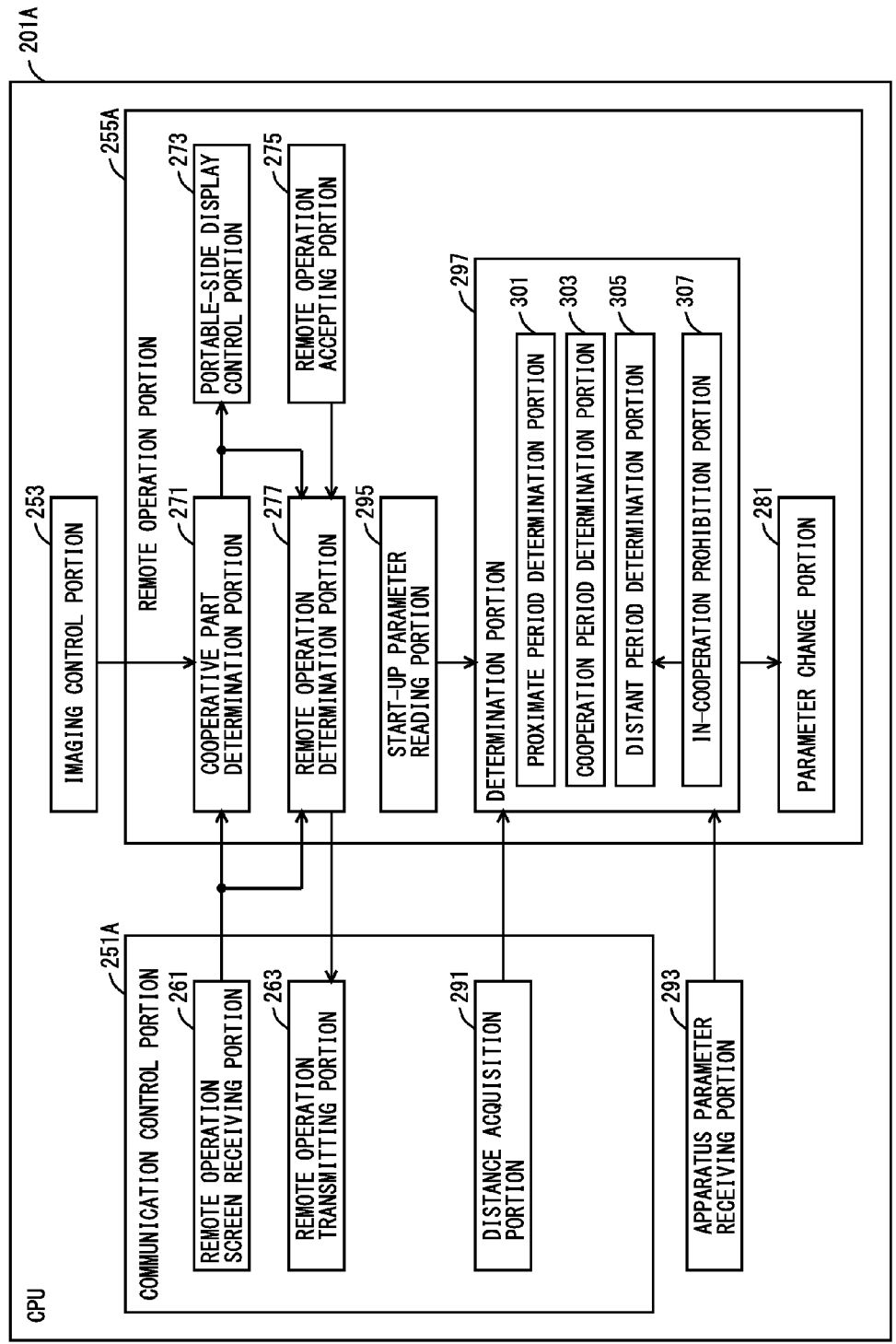
FIG. 10 is a block diagram showing an example of an overview of the functions of the CPU of the portable information device in a second embodiment.

FIG. 10 is a block diagram showing an example of an overview of the functions of the CPU of the portable information device in the second embodiment. Referring to FIG.

10, the difference from the functions in the first embodiment shown in FIG. 4 lies in that communication control portion 251 and remote operation portion 255 are changed to a communication control portion 251A and a remote operation portion 255A, respectively. Communication control portion 251A does not include start-up parameter transmitting portion 265 and change instruction receiving portion 267 included in communication control portion 251 but includes a distance acquisition portion 291 and an apparatus parameter receiving portion 293. Remote operation portion 255A does not include start-up parameter acquisition portion 278 included in remote operation portion 255 but includes a start-up parameter reading portion 295 and a determination portion 297. The other functions are the same as the functions shown in FIG. 4 and a description thereof is not repeated. Here, an example in which short-range wireless communication unit 210 of portable information device 200 becomes able to communicate with MFP 100 will be described.

Distance acquisition portion 291 acquires the distance to MFP 100. Distance acquisition portion 291 calculates the distance to MFP 100, based on the intensity of radio waves received by short-range wireless communication unit 210 from MFP 100. Distance acquisition portion 291 outputs the acquired distance to determination portion 77. Distance acquisition portion 291 acquires the distance to MFP 100 at predetermined time intervals. This is because portable information device 200 is movable and the distance between portable information device 200 and MFP 100 may vary with time.

Apparatus parameter receiving portion 293 acquires the parameter received by short-range wireless communication unit 210 from MFP 100. The parameter received from MFP 100 is the parameter set in display unit 161 of MFP 100. Apparatus parameter receiving portion 293 outputs the parameter received from MFP 100 to determination portion 297.

Start-up parameter reading portion 295 reads out the parameter set in display unit 206 at the start of remote control and outputs the read parameter to determination portion 297. The parameter set in display unit 206 is a parameter that defines the color displayed by display unit 206, for example, a parameter that defines a color temperature. The parameter set in display unit 206 is hereinafter represented by the unit K (Kelvin) of color temperature. The start of remote control is the time when communication control portion 251A establishes a communication path with MFP 100 and becomes able to communicate.

Determination portion 297 receives the distance to MFP 100 from distance acquisition portion 291, receives the parameter set in display unit 161 of MFP 100 from apparatus parameter receiving portion 293, and receives the parameter set in display unit 206 of portable information device 200 at the start of remote operation from start-up parameter reading portion 295. The parameter set in display unit 161 of MFP 100 is referred to as an apparatus parameter, and the parameter set in display unit 206 of portable information device 200 at the start of remote operation is referred to as a portable parameter, for the sake of explanation. The distance to MFP 100 acquired by distance acquisition portion 291 at the start of remote operation is referred to as start-up distance LS. The distance at which portable information device 200 sets the cooperation mode as a display mode is referred to as cooperation distance LC.

Determination portion 297 determines an update parameter in accordance with the distance to MFP 100 and outputs the determined update parameter to parameter change portion 281. At start-up distance LS, display unit 206 of portable information device 200 is set in the portable parameter. Determination portion 297 determines one of the proximate period, the distant period, and the cooperation period, based on the distance to MFP 100 that is input from distance acquisition portion 291. Determination portion 297 includes a proximate period determination portion 301, a cooperation period determination portion 303, a distant period determination portion 305, and an in-cooperation prohibition portion 307. Determination portion 297 determines, as the proximate period, a period from the start of remote operation until the distance to MFP 100 becomes cooperation distance LC (the first distance), in the period from the start of remote operation to the end of remote operation. Determination portion 297 determines, as the distant period, a period from when the distance to portable information device 200 becomes cooperation distance LC to when the distance becomes longer than cooperation distance LC until the remote operation ends, in a period from the start of remote operation to the end of remote operation.

In the cooperation period in which the distance to MFP 100 is equal to or smaller than cooperation distance LC, cooperation period determination portion 303 determines the same value as the apparatus parameter as the update parameter. Letting the portable parameter be PM, the apparatus parameter be PD, and the distance to MFP 100 be distance LX, update parameter PU(LX) for distance LX in the cooperation period is given by Equation (1) above.

Proximate period determination portion 301 determines an update parameter in the proximate period in which portable information device 200 comes closer to MFP 100. Proximate period determination portion 301 determines, as an update parameter, a value closer to the apparatus parameter as the distance to MFP 100 decreases, until the update parameter has the same value as the apparatus parameter. Update parameter PU(LX) for distance LX in the proximate period is given by Equation (2) above.

Distant period determination portion 305 determines an update parameter in the distant period in which portable information device 200 goes away from MFP 100. Distant period determination portion 305 determines, as an update parameter, a value closer to the portable parameter at the time when the remote operation starts as the distance to MFP 100 increases, until the update parameter has the same value as the portable parameter. In-cooperation prohibition portion 307 prohibits distant period determination portion 305 determining an update parameter in the distant period until the distance to MFP 100 becomes equal to or longer prohibitive distance LI (the second distance) longer than cooperation distance LC. Update parameter PU(LX) for distance LX in the distant period is given by Equation (3) above.

In response to input of the update parameter from determination portion 297, parameter change portion 281 updates the parameter set in display unit 206 with the update parameter.

Figure 11:
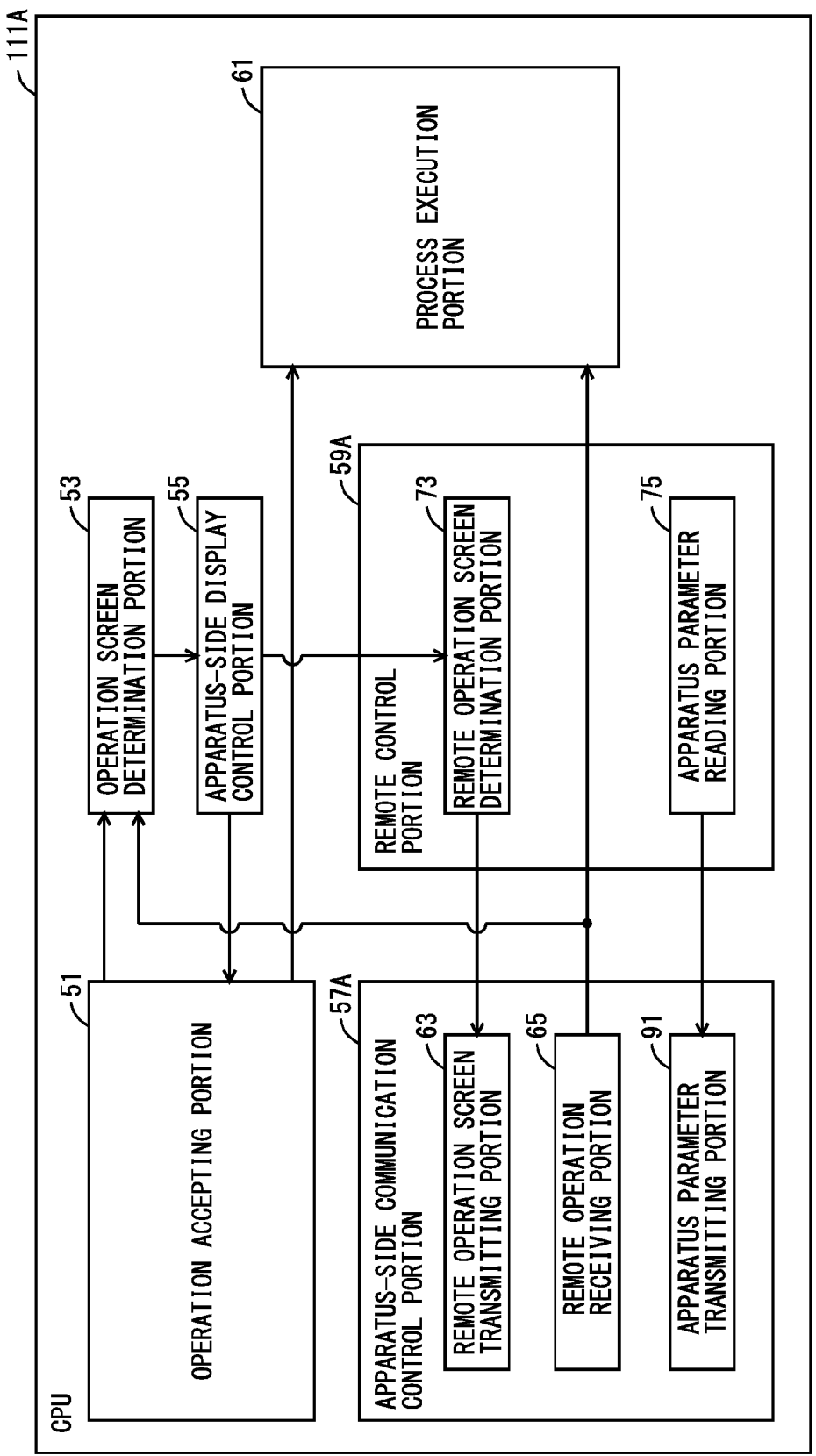
FIG. 11 is a block diagram showing an overview of the functions of the CPU of the MFP in the second embodiment.

FIG. 11 is a block diagram showing an overview of the functions of the CPU of the MFP in the second embodiment. Referring to FIG. 11, the difference from the functions shown in FIG. 5 lies in that apparatus-side communication control portion 57 and remote control portion 59 are changed to an apparatus-side communication control portion 57A and a remote control portion 59A, respectively. Apparatus-side communication control portion 57A does not include distance acquisition portion 67, portable parameter receiving portion 69, and instruction transmitting portion 71 included in apparatus-side communication control portion 57 but includes an apparatus parameter transmitting portion 91. Remote control portion 59A does not include determination portion 77 and parameter change instruction portion 79 included in remote control portion 59.

Apparatus parameter transmitting portion 91 transmits the parameter set in display unit 161 read by apparatus parameter reading portion 75, as an apparatus parameter, to portable information device 200 through short-range wireless communication unit 170. Apparatus parameter transmitting portion 91 transmits the apparatus parameter to portable information device 200 at the time when apparatus-side communication control portion 57A establishes a communication path with portable information device 200, in other words, at the start of remote control.

Apparatus-side display control portion 55 receives a display mode from portable information device 200, and, if the display mode of portable information device 200 is the cooperation mode and the remote operation screen is identical with the operation screen, displays part of the operation screen on display unit 161 and transmits the screen identification information of the operation screen and the positional information indicating the position of the part of the operation screen that is displayed on display unit 161 to remote operation screen determination portion 73.

FIG. 12 is a flowchart showing an example of the remote control process in the second embodiment. Referring to FIG. 12, the difference from the remote control process in the first embodiment shown in FIG. 7 lies in that step S03, step S04, and step S08 to step S10 are deleted and that step S05A is added between step S05 and step S06. The other processing is the same as in the remote control process shown in FIG. 7, and a description is not repeated here. In step S05, the apparatus parameter is acquired, and in the next step S05A, the apparatus parameter is transmitted to portable information device 200 through short-range wireless communication unit 170. The process then proceeds to step S06.

Figure 13:
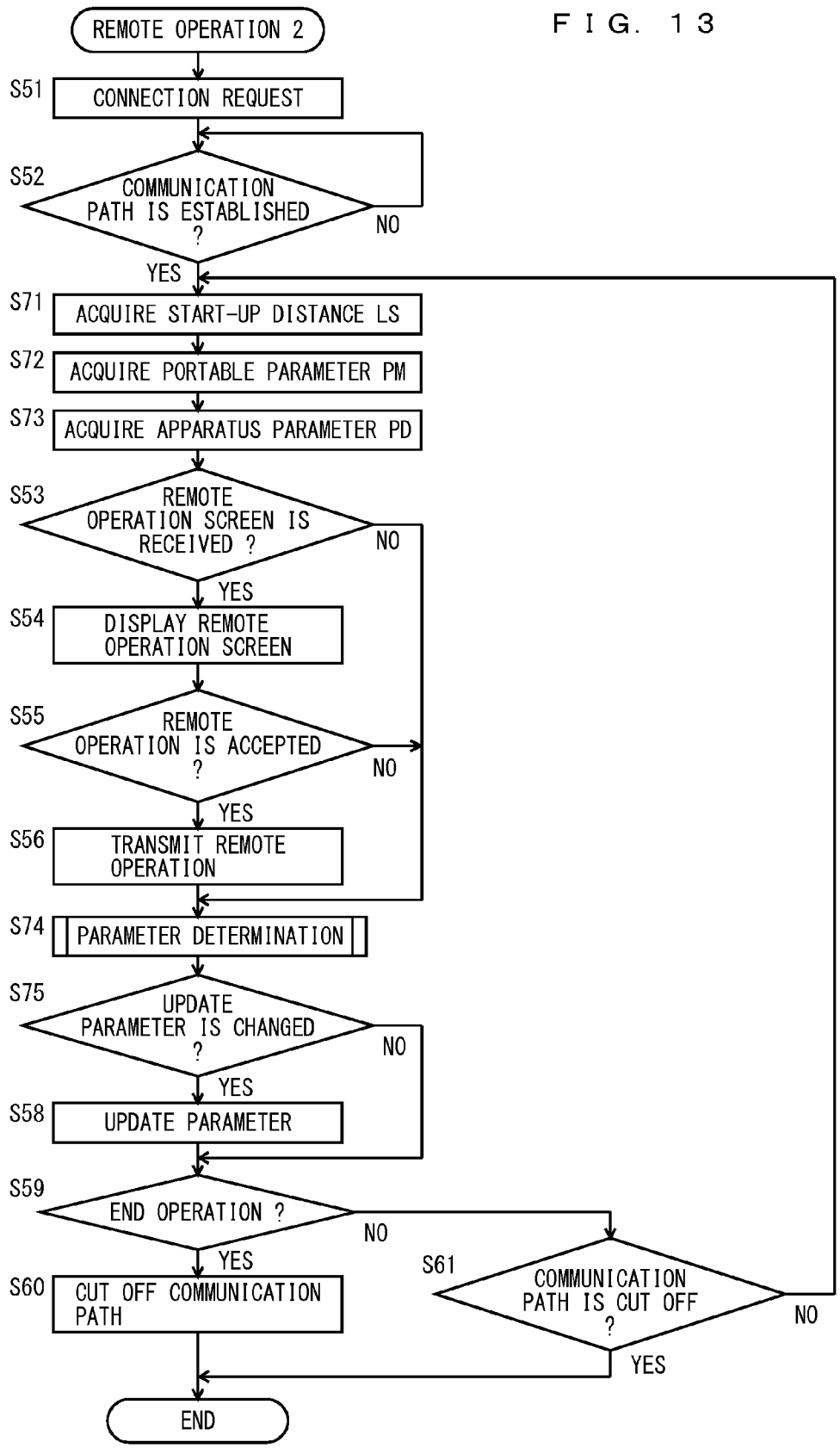
FIG. 13 is a flowchart showing an example of the procedure of a remote operation process in the second embodiment.

FIG. 13 is a flowchart showing an example of the procedure of the remote operation process in the second embodiment. Referring to FIG. 13, the difference from the remote operation process in the first embodiment shown in FIG. 9 lies in that step S71 to step S73 are added between step S52 and step S53 and that step S57 is replaced by step S74 and step S75. The other processing is the same as the processing shown in FIG. 13 and a description is not repeated here.

The processing after step S71 will be described, assuming that a communication path with MFP 100 is established in step S52. In step S71, start-up distance LS is acquired. The distance corresponding to the intensity of radio waves received by short-range wireless communication unit 210 from MFP 100 is calculated and set as start-up distance LS.

In the next step S72, portable parameter PM is acquired. The parameter set in display unit 206 is read out and set as portable parameter PM. Apparatus parameter PD is then acquired, and the process proceeds to step S53. MFP 100 transmits the parameter set in display unit 161 when establishing a communication path with portable information device 200, and the parameter received by short-range wireless communication unit 210 from MFP 100 is acquired as apparatus parameter PD.

In step S53, it is determined whether short-range wireless communication unit 210 has received a remote operation screen from MFP 100. If a remote operation screen has been received, the process proceeds to step S54. If not, the process proceeds to step S76.

In step S54, the remote operation screen is displayed on display unit 206. In step S55, it is determined whether a remote operation has been accepted. If a remote operation has been accepted, the process proceeds to step S56. If not, the process proceeds to step S76. In step S56, the remote operation is transmitted to MFP 100 through the communication path established in step S52, and the process proceeds to step S74.

In step S74, a parameter determination process is performed. The parameter determination process is the same as the process shown in FIG. 8, which is the process for determining an update parameter for updating the parameter set in display unit 206 of portable information device 200. It is then determined whether the update parameter has been changed (step S74). If the update parameter has been changed, the process proceeds to step S75. If not, the process proceeds to step S59.

In step S58, the parameter set in display unit 206 is updated with the update parameter determined in step S74, and the process proceeds to step S59. The color temperature of the image displayed on display unit 206 is thus changed.

As described above, portable information device 200 in the second embodiment displays the remote operation screen related to the operation screen displayed on display unit 161 of MFP 100, on display unit 206. Portable information device 200 then determines an update parameter, based on distance LX to MFP 100, a portable parameter that is a parameter set in display unit 206 when the remote operation starts, and an apparatus parameter that is the parameter set in display unit 161, and updates the parameter set in display unit 206 with the update parameter. The color of the remote operation screen displayed on display unit 206 can be equalized with the color of the operation screen displayed on display unit 161 of MFP 100. The color is gradually changed as the distance to MFP 100 decreases, thereby preventing the user from feeling uncomfortable due to the color rapidly changing color.

In the foregoing first embodiment, MFP 100 calculates the distance to portable information device 200 based on the intensity of radio waves received by short-range wireless communication unit 170 from portable information device 200. In the second embodiment, portable information device 200 calculates the distance to MFP 100 based on the intensity of radio waves received by short-range wireless communication unit 210 from MFP 100. Alternatively, portable information device 200 may calculate the distance based on positional information detected by GPS sensor 211 and the position of MFP 100 registered beforehand and notify MFP 100 of the distance calculated by portable information device 200.

In the first and second embodiments, MFP 100 and portable information device 200 cooperate to display an operation screen and a remote operation screen. However, this cooperation mode may be eliminated. In this case, an update parameter can be calculated with cooperation distance LC set to "0" in Equations (2) and (3).

In the forgoing embodiments, cooperation system 1 has been described. It is needless to say that the present invention can be specified as a remote control method that allows MFPs 100, 101, 102 to perform the remote control process shown in FIG. 8, a remote control program that allows CPU 111 of each MFP 100, 101, 102 to perform the remote control process, a remote operation method that allows portable information device 200 to perform the remote operation process shown in FIG. 13, or a remote operation program that allows CPU 201 controlling portable information device 200 to perform the remote operation process.

Although the present invention has been described and illustrated in detail, it is clearly understood that the same is by way of illustration and example only and is not to be taken by way of limitation, the spirit and scope of the present invention being limited only by the terms of the appended claims.

<APPENDIX>

(1) The image forming apparatus according to claim 6, further comprising an apparatus-side acquisition portion to acquire, from the portable information device, the parameter set in the first display portion at a point of time when remote operation starts, wherein the determination portion determines the update parameter based on the acquired distance, the parameter set in the first display portion at a point of time when remote operation starts, and the parameter set in the second display portion.

(2) The image forming apparatus according to (1), wherein the determination portion includes a proximate period determination portion to determine, as the update parameter, a value proportional to a distance between the portable information device and the image forming apparatus, until the parameter set in the first display portion at a point of time when remote operation starts has a same value as the parameter set in the second display portion, in a proximate period in which the acquired distance decreases with time from a point of time when remote operation starts.

(3) The image forming apparatus according to (1) or (2), wherein the determination portion includes a distant period determination portion to determine, as the update parameter, a value proportional to a distance between the portable information device and the image forming apparatus, until the parameter set in the first display portion has a same value as the parameter set in the first display portion at a point of time when remote operation starts, in a distant period in which the acquired distance increases with time from a point of time when the parameter set in the first display portion has a same value as the parameter set in the second display portion.

(4) The image forming apparatus according to (3), wherein the determination portion further includes an in-cooperation prohibition portion to prohibit determining the update parameter in the distant period until the acquired distance becomes equal to or greater than a threshold.

(5) The image forming apparatus according to any one of (1) to (4), wherein the determination portion includes a cooperation period determination portion to determine an apparatus parameter as the update parameter while the acquired distance is equal to or smaller than a predetermined cooperation distance.

(6) The portable information device according to claim 7, further comprising a parameter acquisition portion to acquire the parameter set in the second display portion from the image forming apparatus, wherein the determination portion determines the update parameter based on the acquired distance, the parameter set in the first display portion at a point of time when remote operation starts, and the acquired parameter set in the second display portion.

(7) The portable information device according to claim (6), wherein the determination portion includes a proximate period determination portion to determine, as a value of the update parameter, a value closer to the parameter set in the second display portion as the distance between the portable information device and the image forming apparatus decreases, until the parameter set in the first display portion at a point of time when remote operation starts has a same value as the parameter set in the second display portion, in a proximate period in which the acquired distance decreases with time from a point of time when remote operation starts.

(8) The portable information device according to (6) or (7), wherein the determination portion includes a distant period determination portion to determine, as the update parameter, a value closer to the parameter set in the first display portion at a point of time when remote operation starts as a distance between the portable information device and the image forming apparatus increases, until the parameter set in the first display portion has a same value as the parameter set in the first display portion at a point of time when remote operation starts, in a distant period in which the acquired distance increases with time from a point of time when the parameter set in the first display portion has a same value as the parameter set in the second display portion.

(9) The portable information device according to (8), wherein the determination portion further includes an in-cooperation prohibition portion to prohibit determining the update parameter in the distance period until the acquired distance becomes equal to or greater than a threshold.

(10) The portable information device according to any one of (6) to (9), wherein the determination portion includes a cooperation period determination portion to determine an apparatus parameter as the update parameter while the acquired distance is equal to or smaller than a predetermined cooperation distance.

What is claimed is:

1. A cooperation system configured with an image forming apparatus and a portable information device capable of communicating with the image forming apparatus,
   the portable information device comprising:
   a first display portion in which a parameter that defines a color for displaying an image is set; and
   a remote operation portion to display a remote operation screen received from the image forming apparatus on the first display portion and transmit a remote operation input by a user in accordance with the remote operation screen to the image forming apparatus,
   the image forming apparatus comprising:
   a second display portion in which a parameter that defines a color for displaying an image is set;
   an apparatus-side display control portion to display an operation screen on the second display portion; and
   a remote control portion to transmit a remote operation screen related to the operation screen displayed on the second display portion to the portable information device and execute a process in accordance with a remote operation received from the portable information device in response to transmission of the remote operation screen,
   one of the portable information device and the image forming apparatus comprising:
   a distance acquisition portion to acquire a distance between the image forming apparatus and the portable information device; and
   a determination portion to determine an update parameter based on the acquired distance,
   the remote operation portion including a parameter change portion to update the parameter set in the first display portion with the update parameter determined by the determination portion.

2. The cooperation system according to claim 1, wherein the determination portion determines the update parameter, based on the acquired distance, a portable parameter that is set in the first display portion at a point of time when remote operation starts, and an apparatus parameter that is a parameter set in the second display portion.

3. The cooperation system according to claim 2, wherein the determination portion includes a proximate period determination portion to determine, as the update parameter, a value closer to the parameter set in the second display portion as a distance between the portable information device and the image forming apparatus decreases, until the parameter set in the first display portion at a point of time when the remote operation starts has a same value as the parameter set in the second display portion, in a proximate period from a point of time when remote operation starts to when the acquired distance becomes the first distance.

4. The cooperation system according to claim 2, wherein the determination portion includes a distant period determination portion to determine, as the update parameter, a value closer to the parameter set in the first display portion at a point of time when remote operation starts as a distance between the portable information device and the image forming apparatus increases, until the parameter set in the first display portion has a same value as the parameter set in the first display portion at a point of time when remote operation starts, in a distant period from when the acquired distance becomes the first distance to when the acquired distance becomes longer than the first distance until remote operation ends.

5. The cooperation system according to claim 4, wherein the determination portion further includes an in-cooperation prohibition portion to prohibit determining the update parameter in the distant period, until the acquired distance becomes equal to or greater than a second distance longer than the first distance.

6. The cooperation system according to claim 2, wherein the determination portion includes a cooperation period determination portion to determine the apparatus parameter as the update parameter while the acquired distance is equal to or smaller than the first distance.

7. An image forming apparatus remotely controlled by a portable information device including a first display portion in which a parameter that defines a color for displaying an image is set, comprising:
 a second display portion in which a parameter that defines a color for displaying an image is set;
 an apparatus-side display control portion to display an operation screen on the second display portion;
 a remote control portion to transmit a remote operation screen related to the operation screen displayed on the second display portion to the portable information device and execute a process in accordance with a remote operation received from the portable information device in response to transmission of the remote operation screen; and
 a distance acquisition portion to acquire a distance to the portable information device,
 the remote control portion including
  a determination portion to determine an update parameter based on the acquired distance, and
  a parameter change instruction portion to allow the portable information device to update the parameter set in the first display portion with the determined update parameter.

8. A portable information device comprising:
 a first display portion in which a parameter that defines a color for displaying an image is set;
 a receiving portion to receive, from an image forming apparatus including a second display portion in which a parameter that defines a color for displaying an image is set, a remote operation screen related to an operation screen displayed on the second display portion;
 a first display control portion to display the received remote operation screen on the first display portion;
 a remote operation transmitting portion to transmit a remote operation input by a user in accordance with the displayed remote operation screen to the image forming apparatus in order to allow the image forming apparatus to execute a process in accordance with the remote operation;
 a distance acquisition portion to acquire a distance to the image forming apparatus;
 a determination portion to determine an update parameter based on the acquired distance; and
 a parameter change portion to update the parameter set in the first display portion with the determined update parameter.

9. A remote control method performed in an image forming apparatus remotely controlled by a portable information device including a first display portion in which a parameter that defines a color for displaying an image is set, the image forming apparatus including a second display portion in which a parameter that defines a color for displaying an image is set, the method comprising:
 an apparatus-side display control step of displaying an operation screen on the second display portion;
 a step of transmitting a remote operation screen related to the operation screen displayed on the second display portion to the portable information device;
 a remote control step of executing a process in accordance with a remote operation received from the portable information device in response to transmission of the remote operation screen; and
 a distance acquisition step of acquiring a distance to the portable information device,
 the remote control step including
  a determination step of determining an update parameter based on the acquired distance, and
  a parameter change instruction step of allowing the portable information device to update the parameter set in the first display portion with the determined update parameter.

10. A remote operation method performed in a portable information device including a first display portion in which a parameter that defines a color for displaying an image is set, the portable information device being capable of remotely controlling an image forming apparatus including a second display portion in which a parameter that defines a color for displaying an image is set, the method comprising:
 a receiving step of receiving a remote operation screen related to an operation screen displayed on the second display portion from the image forming apparatus;
 a first display control step of displaying the received remote operation screen on the first display portion;
 a remote operation transmitting step of transmitting a remote operation input by a user in accordance with the displayed remote operation screen to the image forming apparatus in order to allow the image forming apparatus to execute a process in accordance with the remote operation;
 a distance acquisition step of acquiring a distance to the image forming apparatus;
 a determination step of determining an update parameter based on the acquired distance; and
 a parameter change step of updating the parameter set in the first display portion with the determined update parameter.

11. A non-transitory computer-readable recording medium encoded with a remote control program executed in a computer for controlling an image forming apparatus remotely controlled by a portable information device including a first display portion in which a parameter that defines a color for displaying an image is set, the image forming apparatus including a second display portion in which a parameter that defines a color for displaying an image is set, the program causing the computer to perform processing comprising:

an apparatus-side display control step of displaying an operation screen on the second display portion;

a step of transmitting a remote operation screen related to the operation screen displayed on the second display portion to the portable information device;

a remote control step of executing a process in accordance with a remote operation received from the portable information device in response to transmission of the remote operation screen; and a distance acquisition step of acquiring a distance to the portable information device, the remote control step including a determination step of determining an update parameter based on the acquired distance, and a parameter change instruction step of allowing the portable information device to update the parameter set in the first display portion with the determined update parameter.

12. A non-transitory computer-readable recording medium encoded with a remote operation program performed in a computer for controlling a portable information device including a first display portion in which a parameter that defines a color for displaying an image is set, the portable information device being capable of remotely controlling an image forming apparatus including a second display portion in which a parameter that defines a color for displaying an image is set, the program causing the computer to perform processing comprising:

a receiving step of receiving a remote operation screen related to an operation screen displayed on the second display portion from the image forming apparatus;

a first display control step of displaying the received remote operation screen on the first display portion;

a remote operation transmitting step of transmitting a remote operation input by a user in accordance with the displayed remote operation screen to the image forming apparatus in order to allow the image forming apparatus to execute a process in accordance with the remote operation;

a distance acquisition step of acquiring a distance to the image forming apparatus;

a determination step of determining an update parameter based on the acquired distance; and a parameter change step of updating the parameter set in the first display portion with the determined update parameter.

* * * * *